US011772221B2

(12) United States Patent
Kolb et al.

(10) Patent No.: US 11,772,221 B2
(45) Date of Patent: Oct. 3, 2023

(54) HANDHELD WORK APPARATUS

(71) Applicant: Andreas Stihl AG & Co. KG, Waiblingen (DE)

(72) Inventors: Joachim Kolb, Ludwigsburg (DE); Martin Failenschmid, Stuttgart (DE); Benedikt Posner, Stuttgart (DE); Sebastian Friedrich, Korb (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 147 days.

(21) Appl. No.: 17/345,934

(22) Filed: Jun. 11, 2021

(65) Prior Publication Data

US 2021/0299805 A1     Sep. 30, 2021

Related U.S. Application Data

(62) Division of application No. 15/918,940, filed on Mar. 12, 2018, now Pat. No. 11,141,828.

(30) Foreign Application Priority Data

Mar. 11, 2017 (DE) .................... 10 2017 002 353.0

(51) Int. Cl.
*B23Q 11/00* (2006.01)
*B25F 5/02* (2006.01)

(52) U.S. Cl.
CPC ........... *B23Q 11/0089* (2013.01); *B25F 5/02* (2013.01)

(58) Field of Classification Search
CPC ........ H01H 3/20; H01H 9/26; B23Q 11/0089; F16P 3/18; F16P 3/20
See application file for complete search history.

(56) References Cited

U.S. PATENT DOCUMENTS 2,046,531 A * 7/1936 Page .................... F16P 3/24
192/131 R
3,563,356 A * 2/1971 Glickman .............. G05G 11/00
192/131 R
3,844,360 A   10/1974 Green et al.
(Continued)

FOREIGN PATENT DOCUMENTS

CH           667126 A5     9/1988
CN         103765051 A     4/2014
(Continued)

*Primary Examiner* — Joshua G Kotis
(74) *Attorney, Agent, or Firm* — Walter Ottesen, P.A.

(57) ABSTRACT

A first actuating element acts on a blocking device for an operator-controlled element for controlling the drive motor. In an enabled position of the blocking device, the operator-controlled element is enabled to control the drive motor. In a blocking position the blocking device mechanically blocks any actuation of the operator-controlled element. The first element acts on the blocking device via a transfer unit. In an actuated position of a second actuating element, the transfer unit establishes an operative connection between the first element and the blocking device, such that the blocking device is in the enabled position in the actuated position of the first element and is in the blocking position in the non-actuated position of the first element. In the non-actuated position of the second actuating element, the transfer unit is ineffective so that the blocking device is in the blocking position regardless of the first element's position.

4 Claims, 13 Drawing Sheets

(56) References Cited

U.S. PATENT DOCUMENTS

| | | | |
|---|---|---|---|
| 4,569,431 A * | 2/1986 | Roeker | F16P 3/24 |
| | | | 251/263 |
| 5,065,476 A | 11/1991 | Dohse et al. | |
| 5,724,737 A | 3/1998 | Stones | |
| 5,862,713 A * | 1/1999 | Tsunoda | F02D 11/02 |
| | | | 74/489 |
| 5,969,312 A | 10/1999 | Svetlik et al. | |
| 6,548,776 B1 | 4/2003 | Jong | |
| 6,555,773 B1 | 4/2003 | Broghammer et al. | |
| 6,753,490 B2 * | 6/2004 | Svetlik | H01H 3/20 |
| | | | 200/518 |
| 7,000,593 B2 | 2/2006 | Mueller et al. | |
| 9,353,721 B2 | 5/2016 | Eberle et al. | |
| 9,636,792 B2 | 5/2017 | Mandalka et al. | |
| 10,195,703 B2 * | 2/2019 | Boeck | B25F 5/00 |
| 2002/0059731 A1 | 5/2002 | Zeiler et al. | |
| 2002/0139654 A1 * | 10/2002 | Jong | H01H 9/06 |
| | | | 200/332.2 |
| 2003/0089575 A1 | 5/2003 | Jong | |
| 2008/0011592 A1 | 1/2008 | Liebert et al. | |
| 2010/0012700 A1 | 1/2010 | Perron et al. | |
| 2010/0078298 A1 | 4/2010 | Freundt et al. | |
| 2010/0236801 A1 | 9/2010 | Furusawa et al. | |
| 2011/0005905 A1 * | 1/2011 | Fukinuki | B25F 5/02 |
| | | | 200/43.18 |
| 2012/0023761 A1 | 2/2012 | Martinsson et al. | |
| 2014/0174772 A1 | 6/2014 | Mandalka et al. | |
| 2014/0242888 A1 | 8/2014 | Boeck et al. | |
| 2015/0013490 A1 | 1/2015 | Schirmer et al. | |
| 2015/0170848 A1 | 6/2015 | Kannan et al. | |
| 2015/0367496 A1 | 12/2015 | Kaupp | |

FOREIGN PATENT DOCUMENTS

| | | |
|---|---|---|
| CN | 105196257 A | 12/2015 |
| DE | 10 2012 025 309 A1 | 6/2014 |
| EP | 0 599 550 A1 | 6/1994 |
| EP | 1 193 036 A2 | 4/2002 |
| EP | 1 506 706 A1 | 2/2005 |
| EP | 1 616 472 A1 | 1/2006 |
| WO | 03/061913 A1 | 7/2003 |

* cited by examiner

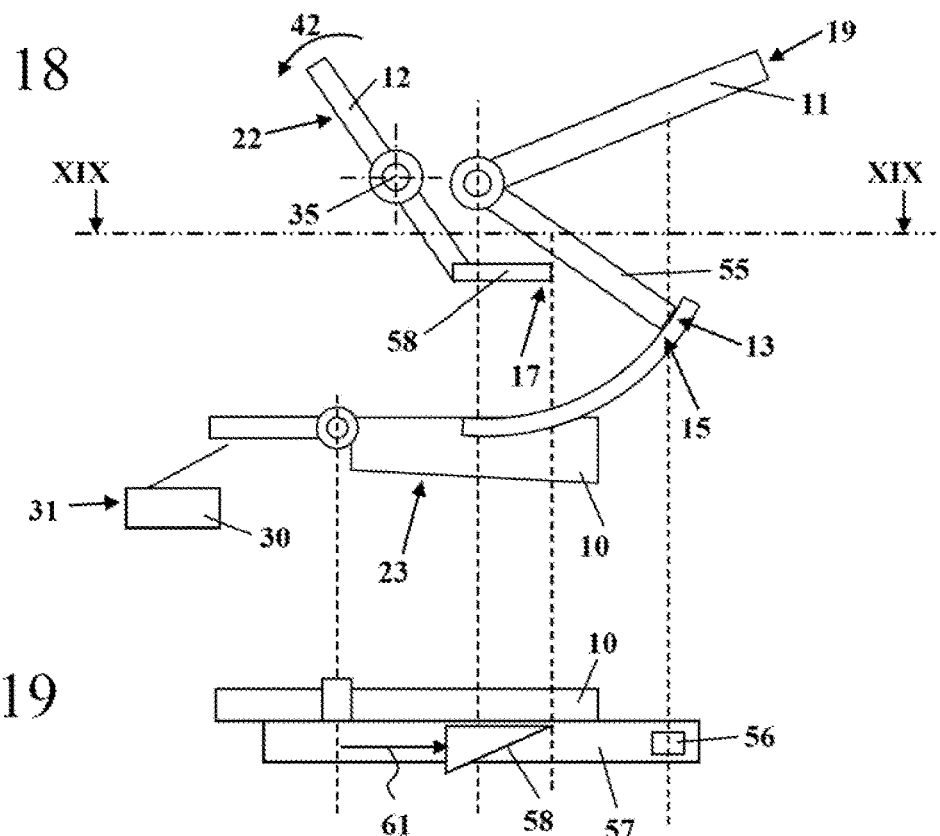
Fig. 18
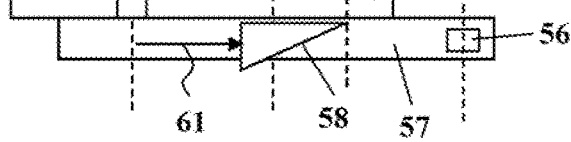
Fig. 19
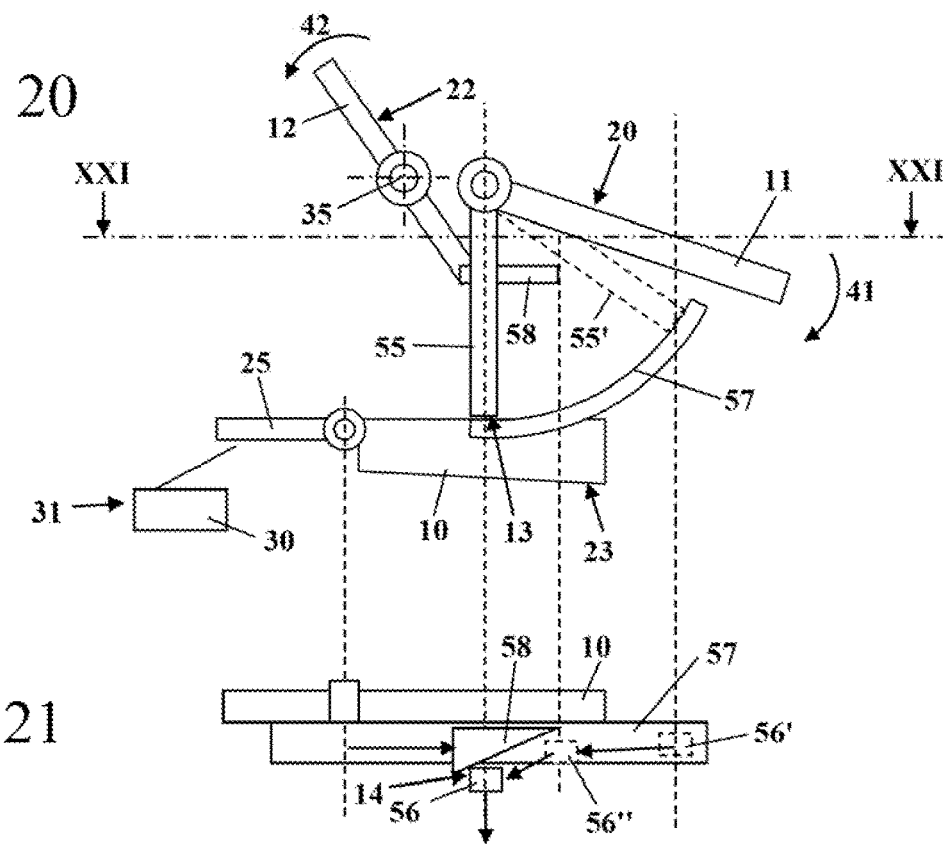
Fig. 20
Fig. 21

HANDHELD WORK APPARATUS

CROSS REFERENCE TO RELATED APPLICATIONS

This application is a divisional application of U.S. patent application Ser. No. 15/918,940, filed Mar. 12, 2018, which claims priority of German patent application no. 10 2017 002 353.0, filed Mar. 11, 2017; the entire contents of both applications are incorporated herein by reference.

BACKGROUND

U.S. Pat. No. 9,636,792 discloses a handheld work apparatus having a first actuating element and a second actuating element and an operator-controlled element for controlling the drive motor. In order for it to be possible to actuate the operator-controlled element, both actuating elements have to be actuated. The first actuating element acts on the blocking device. The second actuating element blocks the actuation of the first actuating element. This prevents the first actuating element from being able to be actuated unless the second actuating element is pressed.

SUMMARY

It is an object of the invention to provide a handheld work apparatus with an advantageous structure.

This object can, for example, be achieved by a handheld work apparatus including: a drive motor; an operator-controlled element for controlling the drive motor; a housing; a blocking device for the operator-controlled element having an enabled position in which the operator-controlled element is enabled to control the drive motor; a first actuating element configured to act on the blocking device and having an actuated position and a non-actuated position; a second actuating element having an actuated position and a non-actuated position; the blocking device further having a blocking position in which the blocking device mechanically blocks an actuation of the operator-controlled element; a transfer unit; the first actuating element being configured to act on the blocking device via the transfer unit; the transfer unit being configured, when the second actuating element is in the actuated position, to establish an operative connection between the first actuation element and the blocking device so that the blocking device is in the enabled position when the first actuating element is in the actuated position thereof and the blocking device is in the blocking position when the first actuating element is in the non-actuated position; and, the transfer unit being without effect when the second actuating element is in the non-actuated position thereof so that the blocking device is in the blocking position independent of the position of the first actuating element.

It has been found that, depending on the structure of the work apparatus, damage to the first actuating element can occur when the first actuating element is actuated forcefully, for example when the work apparatus falls onto the first actuating element such that the first actuating element is actuated with a high actuating force while the second actuating element is not pressed.

The present invention now provides for the first actuating element to act on the blocking device not directly but via a transfer unit and for the second actuating element to act on the transfer unit. The second actuating element acts in this case on the transfer unit such that the transfer unit establishes an operative connection between the first actuating element and the blocking device in the actuated position of the second actuating element. As a result, the blocking device is in the enabled position in the actuated position of the first actuating element and in the blocking position in the non-actuated position of the first actuating element. In the actuated position of the second actuating element, the operator can accordingly adjust the blocking device into its enabled position by actuating the first actuating element.

In the non-actuated position of the second actuating element, the transfer unit is ineffective, and the blocking device is in the blocking position, regardless of the position of the first actuating element. In the non-actuated position of the second actuating element, too, the first actuating element can accordingly be adjusted into the actuated position. The adjustment of the first actuating element into the actuated position does not bring about any adjustment of the blocking device into the enabled position, however, but remains ineffective.

As a result, it is easily possible for the first actuating element and the second actuating element to be able to be actuated independently of one another, in particular in any desired order. It is only when both actuating elements are in the actuated state that the blocking device is in its enabled position and the operator-controlled element is enabled to operate the drive motor. Since the operator-controlled element is mechanically blocked by the first actuating element, the operator-controlled element cannot be actuated unless both the first actuating element and the second actuating element are in their actuated position.

The invention provides in particular for the transfer unit to have an inactive state in which the blocking device is in the blocking position regardless of the position of the first actuating element. Accordingly, the transfer unit does not transfer the actuating movement of the first actuating element to the blocking device such that the blocking device can reach its enabled state. In the non-actuated position of the second actuating element, the transfer unit is in the inactive state. The transfer unit also has an inactive state, which the transfer unit is in with the second actuating element in the actuated position. In the active state, the transfer unit establishes an operative connection between the first actuating element and the blocking device. An operative connection between the first actuating element and the blocking element means in this case that the blocking device is in the blocking position when the actuating element is in the non-actuated position, and that the blocking device is in the enabled position when the first actuating element is in its actuated position, that is, the operator actuates, for example pushes or moves, the first actuating element. The transfer unit accordingly transfers the actuating movement of the first actuating element to the blocking device in order to adjust the blocking device between its blocking position and its enabled position.

In an advantageous configuration, the second actuating element or the transfer unit keeps the first actuating element in its actuated position when the second actuating element is in its actuated position. As a result, the operator does not have to permanently hold the first actuating element, as long as the second actuating element is actuated.

Advantageously, in its actuated position, the operator-controlled element keeps the first actuating element in its actuated position when the operator-controlled element is in its actuated position. As a result, the operator does not have to keep the first actuating element permanently pressed, as long as the operator-controlled element is actuated. However, provision may also be made for the first actuating element to be restored or to be able to be restored into its non-actuated position while the operator-controlled element is pressed, and for the blocking device to be restored into its blocking position only when the operator-controlled element is released.

A simple structure is achieved when the second actuating element, in the non-actuated position, keeps the blocking device in its blocking position. This ensures, with the second actuating element in the non-actuated position, that the first actuating element cannot adjust the blocking device into its enabled position. The second actuating element can in this case keep the blocking device in its blocking position directly or indirectly, for example via components coupled to the first actuating element.

Advantageously, a holding contour is provided, which keeps the blocking element in the enabled position with the operator-controlled element in the actuated position. This prevents the blocking device from being adjusted back into its blocking position with the operator-controlled element actuated, for example when the first and/or the second actuating element is/are released. In this case, provision can be made for the first actuating element and/or the second actuating element to additionally be held by the operator-controlled element in its actuated position. Alternatively, provision can be made for the first and/or the second actuating element to be able to be restored into their non-actuated position with the operator-controlled element in the actuated position.

A simple structure is achieved when the blocking device includes at least one blocking element, wherein, in the blocking position, the blocking element is supported on a support and blocks any movement of the operator-controlled element in the operating direction. Advantageously, in the blocking position, the blocking element is supported with respect to a movement of the operator-controlled element in the operating direction. The support is preferably arranged in a manner fixed to the housing and, in the event of actuations of the first actuating element, of the second actuating element, and of the operator-controlled element, does not move along therewith. Advantageously, the blocking element cooperates directly with the operator-controlled element and bears against a blocking contour or a blocking section of the operator-controlled element. In an alternative configuration, provision is preferably made for the blocking element to be coupled to at least one of the actuating elements and, in the non-actuated position of the actuating element, to project into the pivoting path of the operator-controlled element and to be located outside the pivoting path of the operator-controlled element in the actuated position of the actuating element.

In an advantageous variant embodiment, the transfer unit includes a pivot joint, and the second actuating element changes the situation of the pivot joint, that is, the situation of the pivot axis of the pivot joint. The first actuating element advantageously brings about an adjustment of the blocking device into the enabled position only in one situation of the pivot joint. In a situation of the pivot joint with the second actuating element in the non-actuated position, any adjustment of the first actuating element into the actuated position advantageously remains ineffective, and the locking device remains in its blocking position. In this case, the situation of a blocking element of the blocking device can change or remain unchanged when the first actuating element is actuated.

A simple structure is achieved when the pivot joint is guided in a guide, the situation of which is adjusted by the second actuating element. In an alternative variant embodiment, provision is advantageously made for the transfer unit to include a resilient element and for a movement of the first actuating element in the operating direction to bring about a deformation of the resilient element when the blocking device is in the blocking position and the second actuating element is in the non-actuated position. The actuating movement of the first actuating element is accordingly taken up at least partially by the elasticity of the resilient element, such that the actuating movement of the first actuating element does not act on the blocking device and results in an adjustment of the blocking device into the enabled position. As a result, in the non-actuated position of the second actuating element, any actuation of the first actuating element remains ineffective. The operative connection between the first actuating element and the blocking device is thus interrupted. The resilient element can, in an advantageous configuration, also be formed by a suitable elastic configuration of the first actuating element itself. Advantageously, the second actuating element keeps a blocking element of the blocking device in the blocking position.

In an alternative advantageous variant embodiment, the blocking device has a blocking contour, which, in the blocking position, is in contact with an element of the transfer unit. The second actuating element, in the actuated position, advantageously moves the element of the transfer unit out of contact with the blocking contour upon actuation of the first actuating element. The moving of the element of the transfer unit out of contact with the blocking contour corresponds to an adjustment of the blocking device into the enabled position. With the second actuating element not actuated, the first actuating element is ineffective, and the element of the transfer unit is in contact with the blocking contour in any position of the first actuating element, such that the blocking device is in the blocking position regardless of the position of the first actuating element. In the actuated position of the second actuating element, the second actuating element moves the element of the transfer unit out of contact with the blocking contour, such that the blocking device is in its blocking position or its enabled position depending on the position of the first actuating element. As a result, the transfer unit is active and establishes an operative connection between the first actuating element and the blocking device. Advantageously, the blocking contour is firmly connected to the operator-controlled element, and the second actuating element deflects the element of the transfer unit out of the range of movement of the blocking contour via a ramp. This results in a simple, compact structure. The transfer unit is in this case formed by the element of the transfer unit and the ramp.

In an alternative advantageous configuration, the transfer unit has an intermediate lever on which the first actuating element acts. The first actuating element can pivot freely with respect to the intermediate lever in this embodiment with the second actuating element in the non-actuated position. In the actuated position of the second actuating element, by contrast, a pivoting movement of the first actuating element brings about a pivoting movement of the intermediate lever. As a result, the intermediate lever can be adjusted between an inactive position, in which the first actuating element can pivot freely, and an active position, in which a pivoting movement of the first actuating element brings about a pivoting movement of the intermediate lever and as a result an adjustment of the blocking device between the enabled position and the blocking position. As a result, the second actuating element brings about an adjustment of the intermediate lever of the transfer unit between an active position, in which the first actuating element is operatively connected to the blocking device, and an inactive position, in which there is no operative connection between the first actuating element and the blocking device. A simple configuration is achieved when the blocking device has at least one blocking element formed on the intermediate lever, the blocking element being pivoted out of the pivoting range of the operator-controlled element when the intermediate lever is pivoted. In this case, the intermediate lever can, in an advantageous configuration, be kept, via the operator-controlled element, in the position assigned to the enabled position of the blocking device.

In an alternative advantageous configuration, the transfer unit includes a lever on which the first actuating element and the second actuating element act. Provision is made for the lever to be mounted in an articulated manner such that the transfer unit only acts on the blocking device when the first actuating element and the second actuating element are actuated. In a preferred configuration, the lever is connected to the blocking element centrally, in the manner of a rocker, via a pivot joint, and each of the actuating elements acts on one end of the lever. Only when both actuating elements are actuated is the blocking element deflected to such an extent that the blocking device is in its enabled position.

In an advantageous alternative configuration, the transfer unit is a hydraulic or pneumatic transfer unit, and the second actuating element, in the non-actuated position, interrupts a hydraulic or pneumatic connection between the first actuating element and the blocking device. As a result of the interruption of the hydraulic or pneumatic connection, the transfer unit is inactive and an adjustment of the first actuating element between its actuated position and its non-actuated position does not bring about any adjustment of the blocking device between its blocking position and its enabled position. In the actuated position of the second actuating element, the hydraulic or pneumatic connection between the first actuating element and the blocking device exists. An adjustment of the first actuating element between its non-actuated position and its actuated position then brings about an adjustment of the blocking device between its blocking position and its enabled position.

BRIEF DESCRIPTION OF THE DRAWINGS

The invention will now be described with reference to the drawings wherein:

FIG. 18 shows a schematic illustration of the embodiment in FIGS. 14 and 16 with an actuated second actuating element;

FIG. 19 shows a schematic sectional illustration along the line XIX-XIX in FIG. 18;

FIG. 20 shows a schematic illustration of the arrangement in FIG. 14 with an actuated first and actuated second actuating element;

FIG. 21 shows a schematic sectional illustration along the line XXI-XXI in FIG. 20;

DESCRIPTION OF THE PREFERRED EMBODIMENTS

Figure 1:
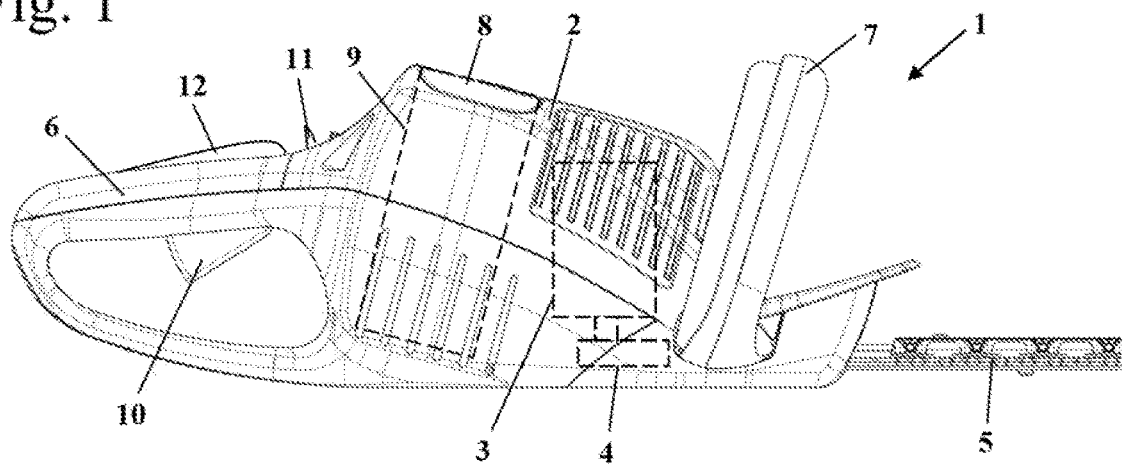
FIG. 1 shows a side view of a handheld work apparatus.

FIG. 1 shows a hedge trimmer as an embodiment of a handheld work apparatus 1. The present invention can also be advantageous for other handheld, in particular portable work apparatuses 1. The work apparatus 1 has a housing 2 in which a drive motor 3 is arranged. In the embodiment shown, the drive motor 3 is configured as an electric motor and is supplied with energy via a rechargeable battery 8 which is arranged in a battery bay 9. Instead of the rechargeable battery 8, a battery or electrical connecting line can be provided for supplying energy to the drive motor 3. Provision may also be made for the drive motor 3 to be a combustion engine. As a tool, the work apparatus 1 has a blade arrangement 5 with a blade bar, not shown in detail, which is driven back and forth by the drive motor 3 via a gear assembly 4. The work apparatus 1 has a rear handle 6 and a bale handle 7 for guiding the work apparatus 1 during operation. A first actuating element 11 is provided on the housing 2 immediately next to the rear handle 6 in the embodiment shown. In the embodiment, an operator-controlled element 10 and a second actuating element 12 are mounted on the rear handle 6. Some other arrangement of the actuating elements 11 and 12 can also be advantageous.

In order to put the drive motor 3 into operation, the operator-controlled element 10 has to be actuated. The operator-controlled element 10 can only be actuated when both the first actuating element 11 and the second actuating element 12 are actuated or are held in an actuated position. Actuation of the actuating elements 11 and 12 and of the operator-controlled element 10 in the present case always means actuation, in particular pressing or pivoting, by an operator. To this end, the actuating elements 11 and 12 and the operator-controlled element 10 project out of the housing 2, such that they can be gripped by an operator. In the following embodiments, the actuating elements 11 and 12 and the operator-controlled element 10 are configured as pivot levers. Some other configuration, for example as a control knob or a slide to be moved in translation, may also be advantageous, however.

Figure 2:
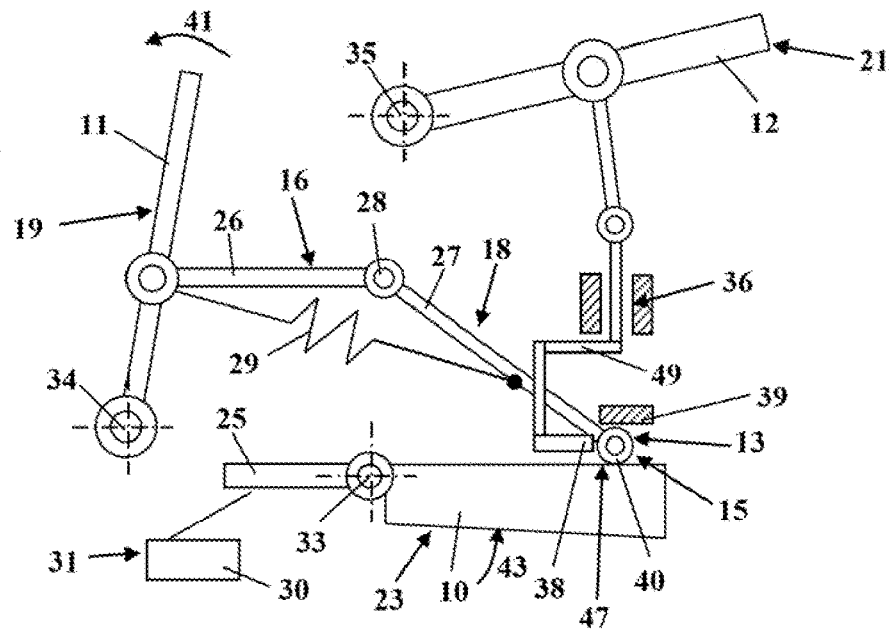
FIGS. 2 to 6 show schematic illustrations of a first embodiment in different positions of the actuating elements and of the operator-controlled element.

As FIG. 2 shows, in the first embodiment, the operator-controlled element 10 is mounted so as to be pivotable about a pivot axis 33. The operator-controlled element 10 has an actuating section 25 which acts on a switch 30. The switch 30 can be an on/off switch or a potentiometer. In FIG. 2, the operator-controlled element 10 is shown in its non-actuated position 23 and the switch 30 in its non-actuated state 31. In the non-actuated state 31 of the switch 30, the drive motor 3 is not in operation. The operator-controlled element 10 cannot be actuated in the state shown in FIG. 2, since a blocking element 40 is arranged in the pivoting path of the operator-controlled element 10. The blocking element 40 is part of a blocking device 13. The blocking element 40 is supported on a support 39 which is arranged in a manner fixed to the housing in the embodiment shown. The operator-controlled element 10 has a blocking contour 47 which cooperates with the blocking element 40 and presses the latter against the support 39 when the operator-controlled element 10 is pressed in an operating direction 43. As a result, actuation of the operator-controlled element 10 is mechanically blocked. In FIG. 2, the blocking device 13 is in its blocking position 15, in which it is not possible to actuate the operator-controlled element 10.

The blocking element 40 is connected to the first actuating element 11 via a transfer unit 16. The actuating element 11 is mounted so as to be pivotable about a pivot axis 34 and is in its non-actuated position 19 in FIG. 2. The transfer unit 16 is formed by two levers 26 and 27 in the embodiment, which are connected together in a pivotable manner at a pivot joint 28. The illustration is only schematic in this case and shows the function but not the structural configuration. The lever 26 is connected to the first actuating element 11 at one end and to the pivot joint 28 at the other end. The second lever 27 is connected to the pivot joint 28 at one end and bears the blocking element 40 at the other end. Some other configuration may also be advantageous, however. The second lever 27 is preloaded by a resilient element, specifically a spring 29. The transfer unit 16 is in its inactive state 18. In this state, the blocking element 40 is arranged on a holding region 38 of a guide element 49. The holding region 38 blocks the path of the blocking element 40 into an enabled position 14 (FIG. 5) of the blocking device 13. The spring 29 preloads the lever 27 in the direction of its enabled position 14, in the embodiment against the holding region 38. The guide element 49 is mounted so as to be displaceable in a guide 36 with respect to the housing 2. The guide element 49 is connected to the second actuating element 12. The second actuating element 12 is in a non-actuated position 21. The second actuating element 12 is mounted so as to be pivotable about a pivot axis 35.

Figure 3:
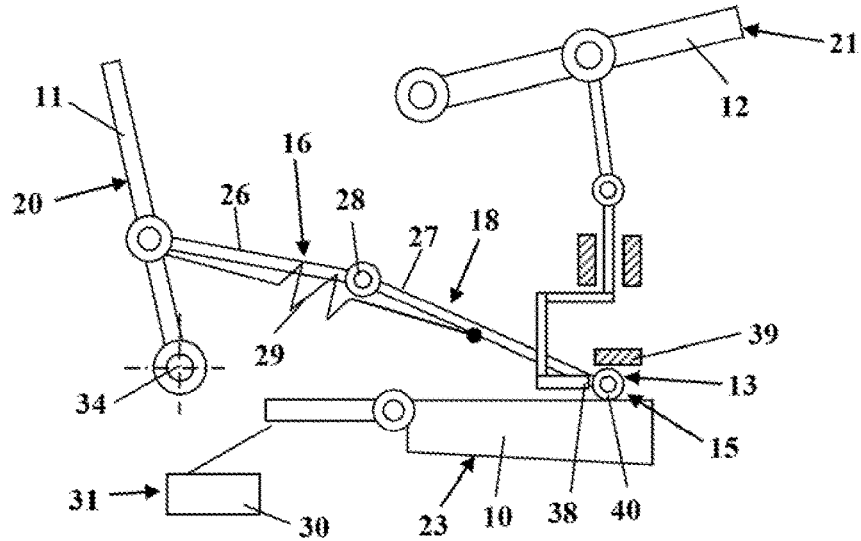

The first actuating element 11 can be actuated in the operating direction 41 by the operator and as a result pivoted about the pivot axis 34. FIG. 3 shows the arrangement after the first actuating element 11 has been pivoted into its actuated position 20. The adjustment of the first actuating element 11 into the actuated position 20 needs to be carried out by an operator. As FIG. 3 shows, the blocking device 13 continues to be in its blocking position 15. The pivoting of the first actuating element 11 has merely brought about a change in the transfer unit 16. The levers 26 and 27 have been pivoted about the pivot joint 28 with respect to one another, with the result that the spring 29 has been tensioned. By contrast, the blocking element 40 has not moved, but rather continues to be kept in the blocking position 15 by the holding region 38. The holding region 38 accordingly has the effect that the transfer unit 16 is inactive and actuation of the first actuating element 11 does not bring about any adjustment of the blocking device 13 into its enabled position 14. The second actuating element 12 keeps the blocking device 13 in its blocking position 15.

Figure 4:
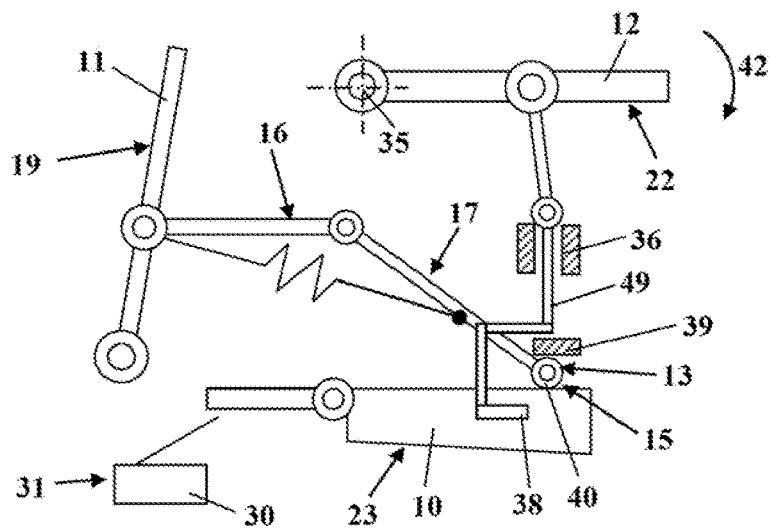

FIG. 4 shows the arrangement with the first actuating element 11 in its non-actuated position 19. The second actuating element 12 has been pivoted in the operating direction 42 into its actuated position 22. The pivoting of the second actuating element 12 about its pivot axis 35 has brought about a movement of the guide element 49 in the guide 36. As a result, the holding region 38 has moved away from the blocking element 40 into a position in which the holding region 38 does not block the movement of the blocking element 40. In the embodiment shown, the holding region 38 moves transversely to the direction of movement of the blocking element 40. In the position shown in FIG. 4, the blocking element 40 can move out of the region of the support 39. As a result, in FIG. 4, the transfer unit 16 is in an active state 17, in which any actuation of the first actuating element 11 brings about a movement of the blocking element 40 and an adjustment of the blocking device 13 between its blocking position 15 and its enabled position 14. The first actuating element 11 is in its non-actuated position 19 and the blocking device 13 in its blocking position 15 in FIG. 4.

Figure 5:
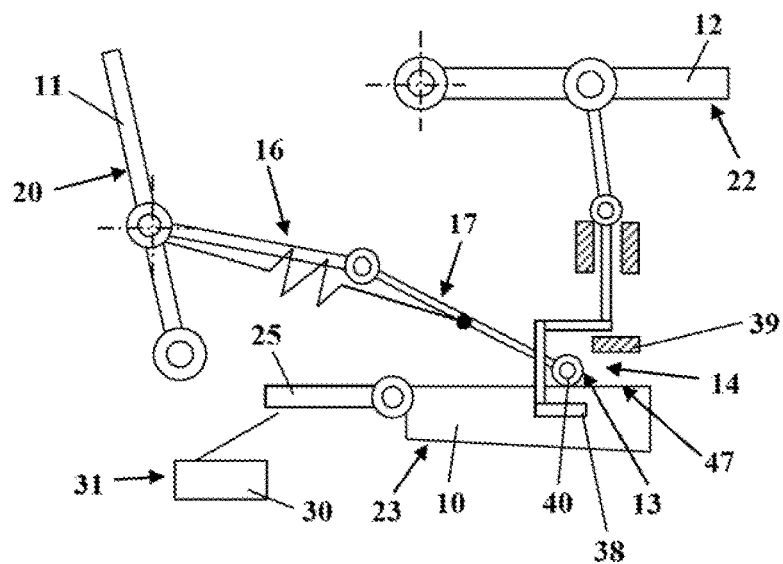

If, proceeding from the position shown in FIG. 4, the first actuating element 11 is pivoted into its actuated position 20, shown in FIG. 5, the transfer unit 16 acts on the blocking element 40 and moves the blocking element 40 out of the region of the support 39. In FIG. 5, the first actuating element 11 is in its actuated position 20 and the second actuating element 12 in its actuated position 22. The blocking device 13 is in its enabled position 14, and the operator-controlled element 10 can be pivoted.

Figure 6:
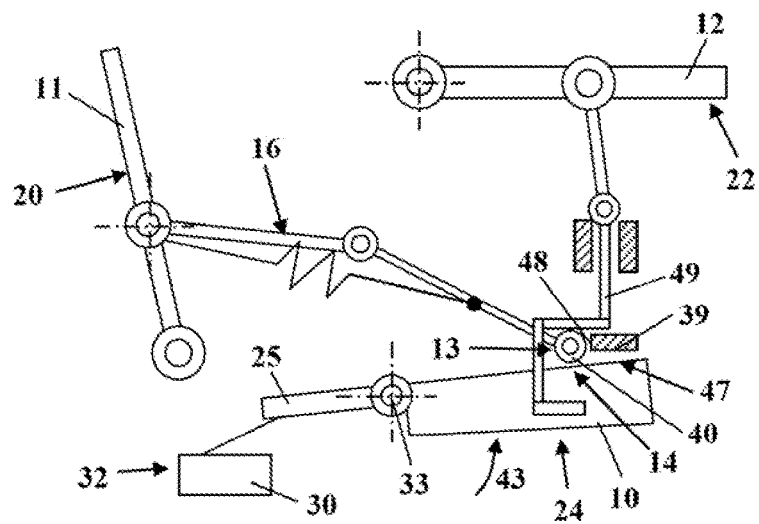

FIG. 6 shows the arrangement after the operator-controlled element 10 has been pivoted in the operating direction 43 into its actuated position 24. The blocking element 40 bears against a holding contour 48 of the support 39 in this position. The blocking element 40 is in this case held between the guide element 49, the holding contour 48 and the blocking contour 47 of the operator-controlled element 10 in the embodiment. The holding contour 48 has the effect that the blocking element 40 cannot move back between the blocking contour 47 and the support 39. As a result, the holding contour 48 keeps the blocking device 13 in its enabled position 14. As a result of the operator-controlled element 10 pivoting into its actuated position 24, the actuating portion 25 of the operator-controlled element 10 has moved with respect to the switch 30 and actuated the switch 30. The switch 30 is now in its actuated state 32, in which the drive motor 3 is in operation.

Figure 7:
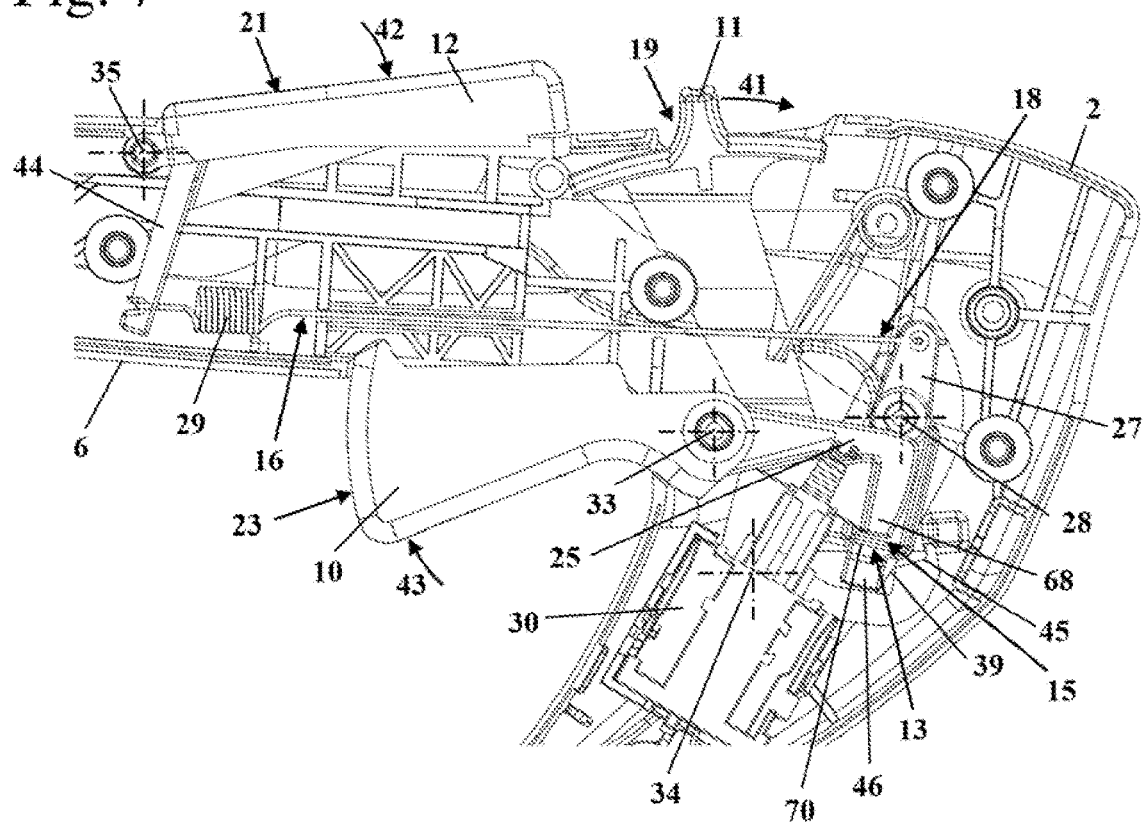
FIG. 7 and FIG. 8 show schematic sectional illustrations of a further embodiment in different positions of the actuating elements and of the operator-controlled element
Figure 8:
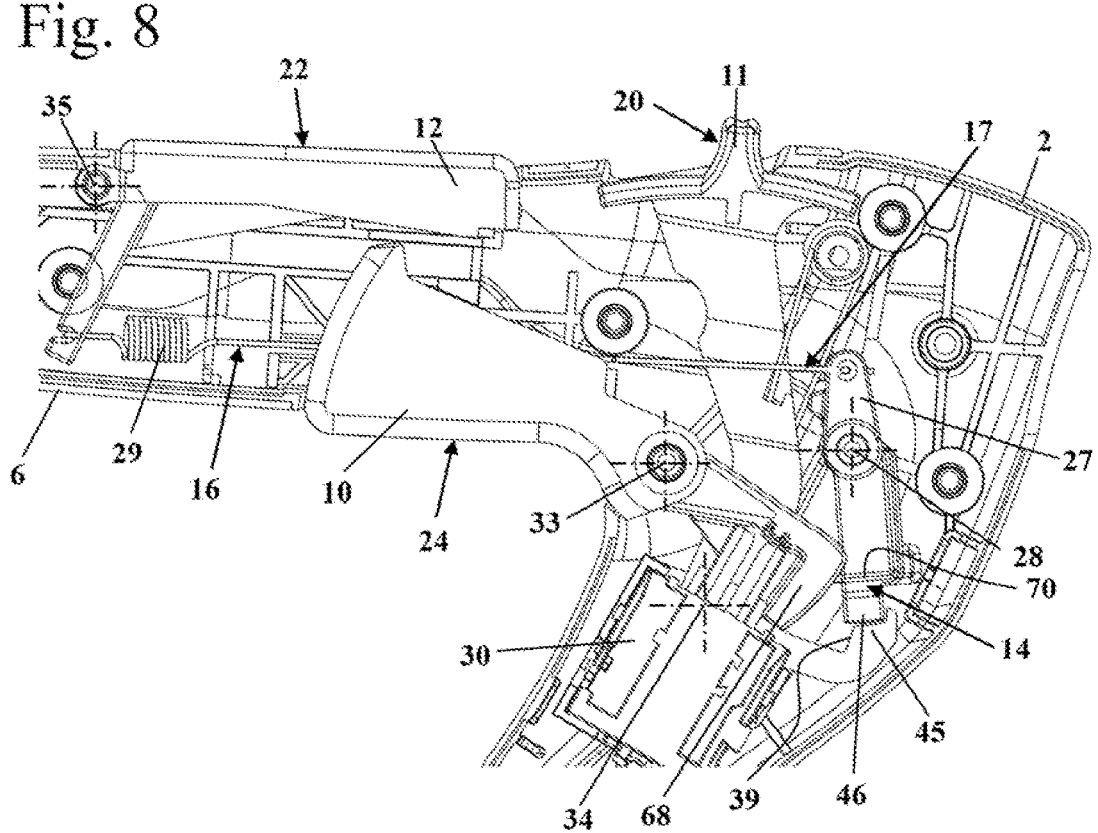

FIG. 7 and FIG. 8 show a possible structural embodiment which is based on the operating principle shown in FIGS. 2 to 6. Identical reference signs in this case identify mutually corresponding elements and elements with an identical or similar function in all the figures. The first actuating element 11 is mounted so as to be pivotable about a pivot axis 34. In FIG. 7, the first actuating element 11 is illustrated in a non-actuated position 19. The second actuating element 12 is mounted so as to be pivotable about a pivot axis 35 and is likewise illustrated in a non-actuated position 21. The operator-controlled element 10, too, is in a non-actuated position 23. The second actuating element 12 has an arm 44 which is connected firmly to the section projecting out of the housing and on which a spring 29 is mounted. The spring 29 couples the arm 44 to a lever 27 which is mounted in a pivotable manner on a pivot joint 28. In contrast to the configuration according to FIGS. 2 to 6, in the configuration according to FIG. 7, the pivot joint 28 is not provided between the lever 27 and a further lever but between the lever 27 and the housing 2. Together with the lever 27, the spring 29 forms the transfer unit 16, which is in its inactive state 18 in the illustration in FIG. 7. The lever 27 has a holding extension 46. Formed on the first actuating element 11 is a support 39, which is located in the pivoting path of the lever 27 in the non-actuated position 19 of the first actuating element 11. As a result, the lever 27 is blocked.

If, with the first actuating element 11 in the non-actuated position 19, the second actuating element 12 is actuated in the operating direction 42 and is pivoted into the actuated position 22 shown in FIG. 8, the spring 29 is extended. The lever 27 is prevented from pivoting by the support 39. The lever 27 is part of a blocking device 13, which includes a blocking element 70 on the lever 27 and a blocking section 68 on the operator-controlled element 10. The blocking section 70 is located in the pivoting path of the blocking section 68 in the blocking position 15 of the blocking device 13, such that the operator-controlled element 10 cannot be pivoted in the operating direction 43.

If the first actuating element 11 is pivoted in the operating direction 41 into the actuated position 20 illustrated in FIG. 8, the support 39 pivots out of the pivoting path of the lever 27. If the second actuating element 12 is actuated in the operating direction 42 and adjusted into its actuated position 22 shown in FIG. 8, the lever 27 pivots about its pivot axis 28 on account of the preloading by the spring 29, and the blocking element 70 on lever 27 passes out of the pivoting region of the operator-controlled element 10. The operator-controlled element 10 can then be pivoted in the operating direction 43 (FIG. 7) into its actuated position 24 (FIG. 8).

Formed on the first actuating element 11 is a holding contour 45 against which the lever 27 bears in the actuated position. In this position of the lever 27, the blocking device 13 is in its enabled position 14. The lever 27 has a second holding contour 46 which lies in the pivoting path of the first actuating element 11 and keeps the first actuating element 11 in its actuated position 20 as long as the second actuating element 12 is in its actuated position 22. If the blocking device 13 is in its enabled position 14, the first actuating element 11 is accordingly kept in its actuated position 20. As a result, the operator can release the first actuating element 11 once the two actuating elements 11 and 12 are in the actuated position 20 or 22, respectively.

As FIG. 8 also shows, in the actuated position 24 of the operator-controlled element 10, the blocking section 68 is located in the pivoting path of the lever 27. As a result, the blocking section 68 of the operator-controlled element 10 keeps the transfer unit 16 in its active state 17 and prevents the lever 27 from being able to pivot back into the position shown in FIG. 7 when the second actuating element 12 is released.

On account of the spring 29, the operating order of the actuating elements 11 and 12 is not predetermined, but can be selected by the operator. It is possible to press the second actuating element 12 first and thus to tension the spring 29. If the first actuating element 11 is then adjusted into the actuated position 20, the pivot lever 27 pivots into its actuated position on account of the force of the spring 29. Actuation of the first actuating element 11 and subsequent actuation of the second actuating element 12 is also possible.

Figure 9:
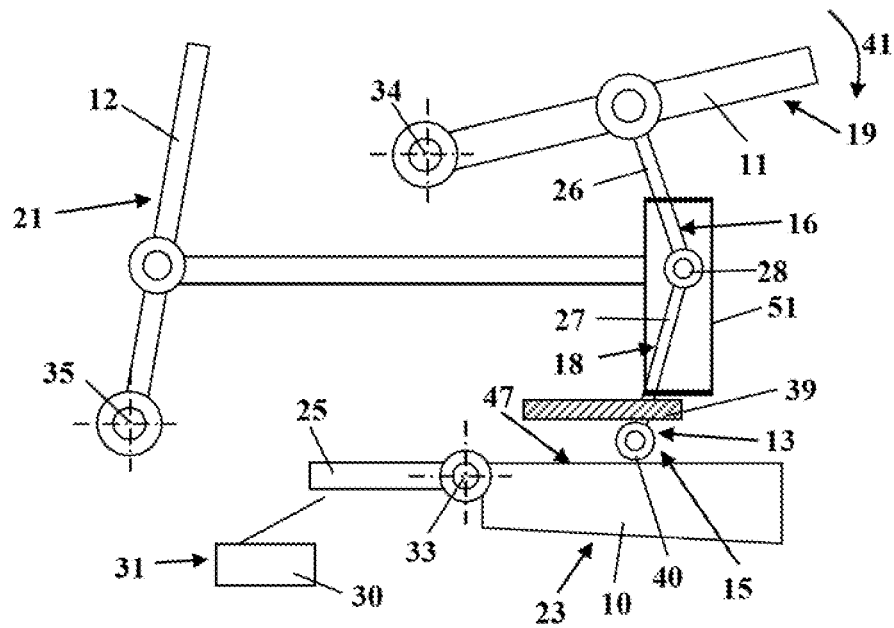
FIGS. 9 to 13 show schematic illustrations of a further embodiment in different positions of the actuating elements and of the operator-controlled element.

FIGS. 9 to 13 show a further embodiment. As FIG. 9 shows, the first actuating element 11 acts on a blocking element 40 via a transfer unit 16. The transfer unit 16 includes two levers 26 and 27 which are connected together in a pivotable manner via a pivot joint 28. In the embodiment according to FIG. 9, a spring which preloads one of the levers is not provided, however. Rather, the pivot joint 28 is guided in a guide 51. The position of the guide 51 is coupled to the position of the second actuating element 12. As a result of the second actuating element 12 being actuated, the position of the pivot joint 28 is changed. FIG. 9 shows the arrangement with the first actuating element 11 in the non-actuated position 19, the second actuating element 12 in its non-actuated position 21, and the operator-controlled element 10 in its non-actuated position 23. The blocking device 13 is in the blocking position 15. The blocking element 40 is arranged between a blocking contour 47 on the operator-controlled element 10 and the support 39 and mechanically prevents any actuation of the operator-controlled element 10. The transfer unit 16 is formed by the levers 26 and 27 and the pivot joint 28 and is in the inactive state 18.

Figure 10:
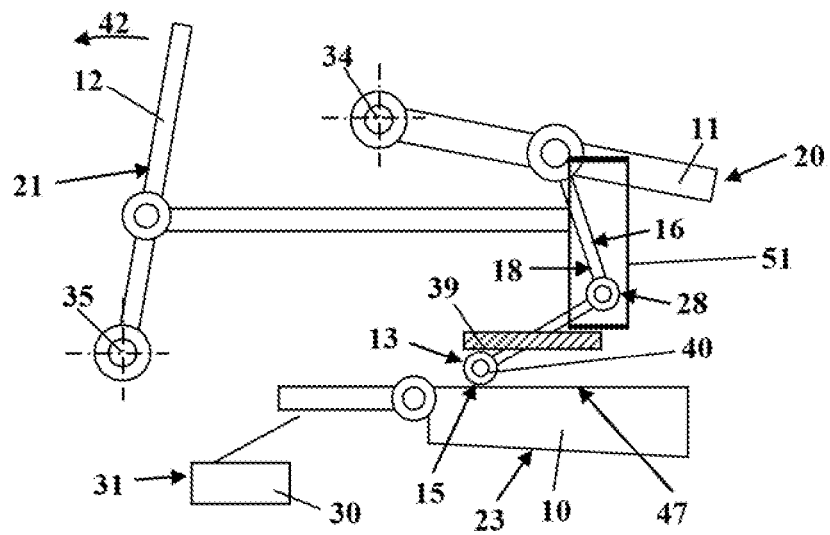

If the first actuating element 11 is adjusted in the operating direction 41 into its actuated position 20, which is shown in FIG. 10, this brings about a movement of the pivot joint 28 within the guide 51. The guide 51 and the support 39 are coordinated with one another such that the blocking element 40 continues to be located between the blocking contour 47 and the support 39 and the blocking device 13 is in its blocking position 15. With the actuating element 12 not actuated, the first actuating element 11 can accordingly be pivoted between its non-actuated position 19 and its actuated position 20 without this bringing about any adjustment of the blocking device 13 between its blocking position 15 and the enabled position 14. The transfer unit 16 is inactive.

Figure 11:
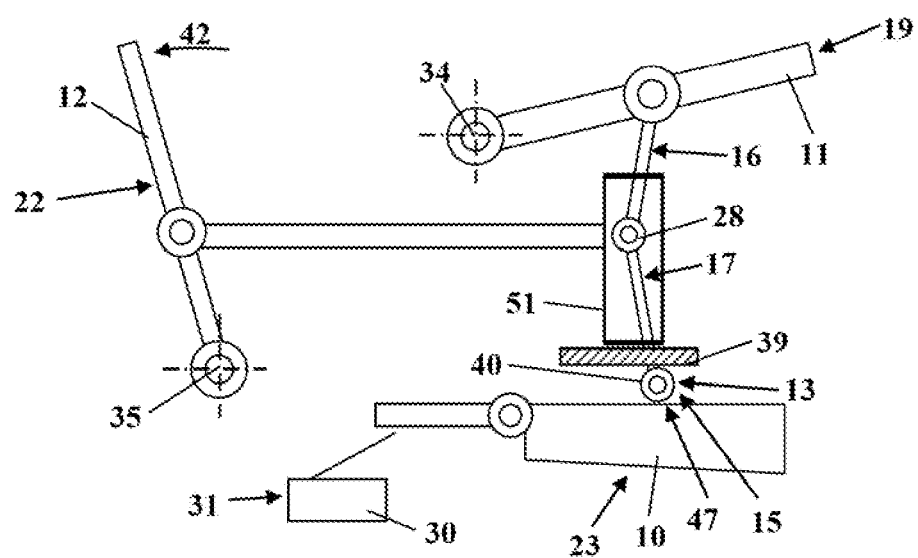
Figure 12:
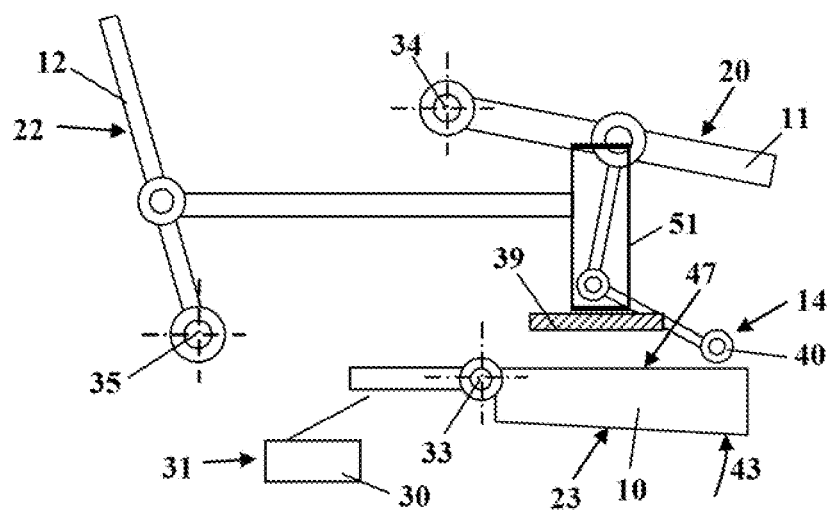
Figure 13:
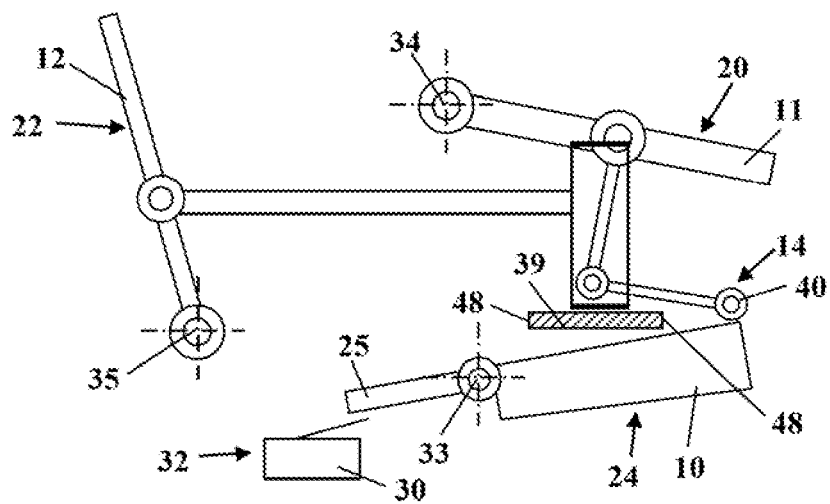

FIG. 11 shows the arrangement with the first actuating element 11 in its non-actuated position 19. The second actuating element 12 has been pivoted in the operating direction 42 with respect to the arrangement in FIG. 9 and is now in its actuated position 22. As a result, the guide 51 has been shifted. The transfer unit 16 is in its active state. The blocking element 40 is arranged between the blocking contour 47 and the support 39, and the blocking device 13 is in its blocking position 15. If the first actuating element 11 is pivoted out of the position shown in FIG. 11 into its actuated position 20 (FIG. 12), the blocking element 40 passes out of the region of the support 39, and the operator-controlled element 10 can be actuated. In FIG. 12, the operator-controlled element 10 is still in the non-actuated position 23. If the operator-controlled element 10 is actuated in the operating direction 43, the operator-controlled element 10 passes into the actuated position 24 shown in FIG. 13. In this position, the actuating section 25 acts on the switch 30 and adjusts the switch 30 from its non-actuated state (FIG. 12) into its actuated state 32 (FIG. 13).

In the embodiment according to FIGS. 9 to 13, too, an alternative operating order is possible. If, starting from the arrangement which is shown in FIG. 10, that is, with the first actuating element 11 in the actuated position 20, the second actuating element 12 is adjusted in the operating direction 42 into its actuated position 22, the guide 51 is shifted to the left in the illustration in FIG. 10. Since the pivot joint 28 is located in an end region of the guide 51, the blocking element 40 is likewise moved to the left when the guide 51 is shifted to the left. As a result, the blocking element 40 moves out of the region of the support 39, and the blocking device 13 is adjusted into its enabled state 14.

In the embodiment according to FIGS. 9 to 13, too, the blocking element 40 is kept in the enabled position 14 by a holding contour 48 when the first actuating element 11 and/or the second actuating element 12 is restored into its non-actuated position 19 or 21, respectively. In the embodiment shown, two holding contours 48 are provided on the end sides of the support 39. Depending on the operating order of the actuating elements 11, 12, one of the holding contours 48 is active.

Figure 14:
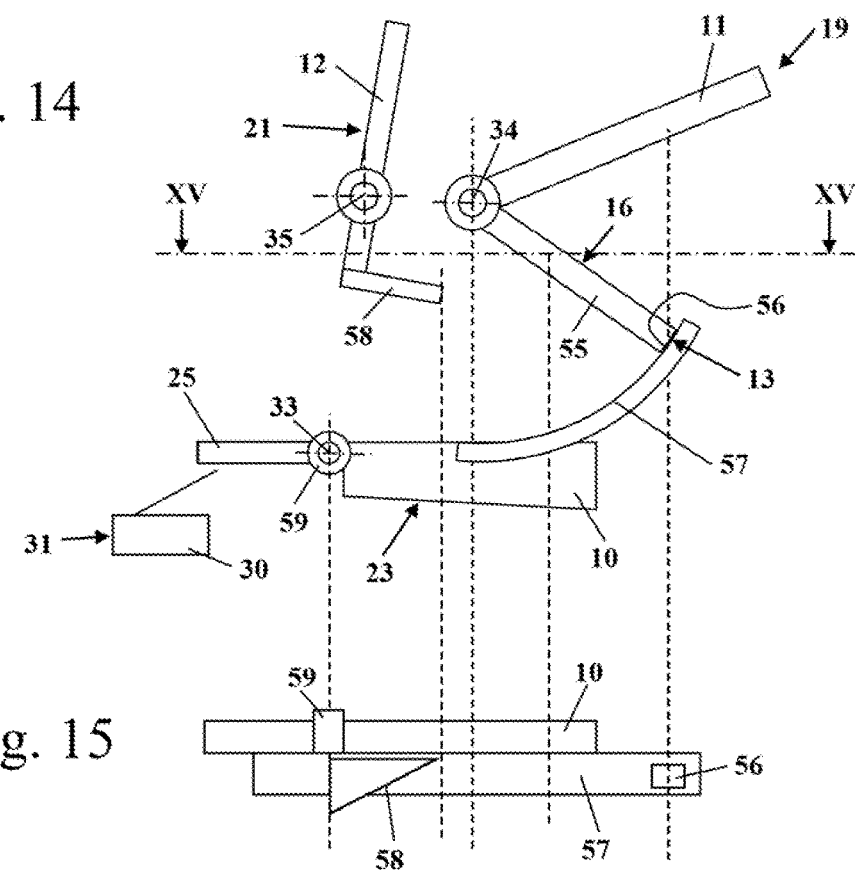
FIG. 14 shows a schematic illustration of a further embodiment with non-actuated actuating elements and a non-actuated operator-controlled element.

FIGS. 14 to 23 show an alternative embodiment. The operator-controlled element 10 is mounted on a bearing 59 so as to be pivotable about the pivot axis 33. A blocking contour 57 that is connected firmly to the operator-controlled element 10 is provided, the blocking contour 57 extending in an arcuate manner about the pivot axis 34 of the first actuating element 11 in the non-actuated position 23 of the operator-controlled element 10 in the embodiment. Formed on the first actuating element 11 is an arm 55, which is part of a transfer unit 16. The arm 55 is resilient. This can be realized for example by inherent elasticity of the material of the arm 55, for example plastics material. In the embodiment, the arm 55 has, at its free end, a blocking element 56 which is located immediately next to the blocking contour 57 or bears on the latter. In the shown non-actuated position 19 of the first actuating element 11, the blocking element 56 on the arm 55 blocks any actuation of the operator-controlled element 10. Together with the blocking contour 57, the blocking element 56 forms a blocking device 13. The second actuating element 12, which is likewise shown in the non-actuated position 21 in FIG. 14, is mounted so as to be pivotable about the pivot axis 35 and is connected to a deflecting element, in the embodiment a ramp 58. The deflecting element is likewise part of the transfer unit 16.

Figure 15:
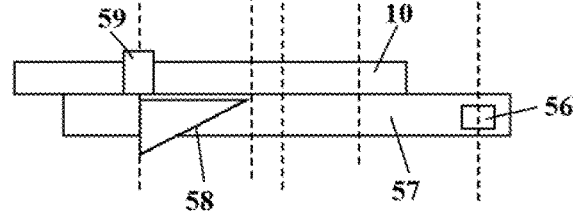
FIG. 15 shows a schematic sectional illustration along the line XV-XV in FIG. 14.

As FIG. 15 shows, the ramp 58 is located in a plane with the blocking element 56 and the blocking contour 57. The ramp 58 is also arranged in a plane with the arm 55 in the embodiment.

Figure 16:
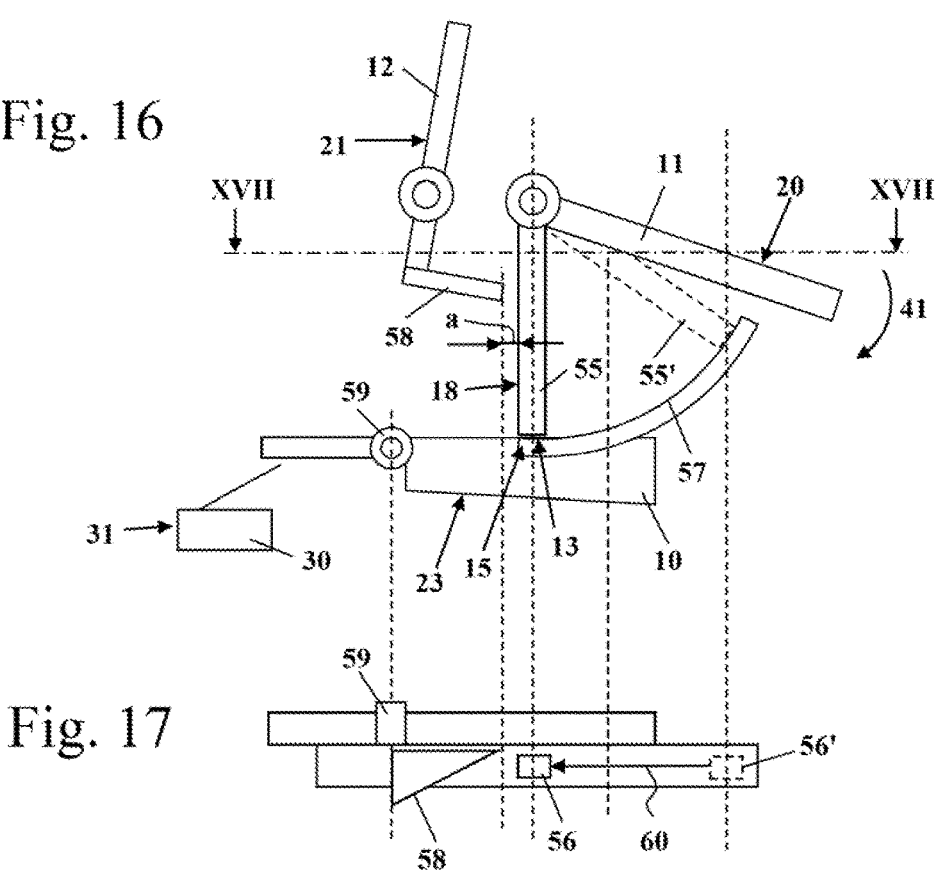
FIG. 16 shows a schematic illustration of the embodiment in FIG. 14 with an actuated first actuating element and non-actuated second actuating element and operator-controlled element.
Figure 17:
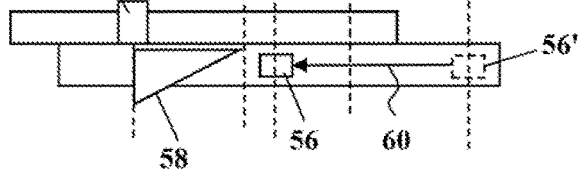
FIG. 17 shows a schematic sectional illustration along the line XVII-XVII in FIG. 16.

FIGS. 16 and 17 show the arrangement upon actuation of the first actuating element 11 in the operating direction 41. During such actuation, the arm 55 moves from the position 55', shown by the dashed line in FIG. 16, to the position, indicated by the solid line, of the arm 55. In the process, as FIG. 17 shows, the blocking element 56 moves in the direction of an arrow 60 from a position 56', shown by a dashed line, to the position, shown by a solid line, of the blocking element 56. In the actuated position 20 of the first actuating element 11, too, the blocking element 56 is located immediately next to the blocking contour 57 and prevents any actuation of the operator-controlled element 10. The transfer unit 16, which is formed by the arm 55 and the ramp 58, is in its inactive state 18, since actuation of the actuating element 11 does not bring about any adjustment of the blocking device 13 into the enabled state. In the non-actuated position 21 of the second actuating element 12, the ramp 58 is located outside the pivoting path of the arm 55. In the embodiment, the ramp 58 is at a spacing a from the position of the arm 55 in the actuated position 20 of the first actuating element 11.

FIG. 18 and FIG. 19 show the arrangement after actuation of the second actuating element 12 in the operating direction 42. In FIGS. 18 and 19, the actuating element 12 is in its actuated position 22. As a result, the ramp 58 has moved in the direction of an arrow 61 into the pivoting path of the arm 55. The first actuating element 11 is in its non-actuated position 19 and the blocking device 13 is in its blocking position 15. The transfer unit 16 formed by the arm 55 and the ramp 58 is now in its active state 17, however. On account of the ramp 58, upon actuation of the first actuating element 11, adjustment of the blocking device 13 into its enabled position 14 is brought about.

FIG. 20 shows the arrangement with the first actuating element 11 actuated and the second actuating element 12 actuated. The arm 55 has moved along the blocking contour 57. As FIG. 21 shows, the ramp 58 has brought about lateral deflection of the arm 55. The blocking element 56 has moved out of the position 56', shown by a dashed line, via the position 56", shown by a dashed line, for instance along the ramp 58 into the position, shown by a solid line, of the blocking element 56. As FIG. 21 shows, the blocking element 56 is located outside the pivoting path of the blocking contour 57. The blocking device 13 is in its enabled position 14 as a result.

Figure 22:
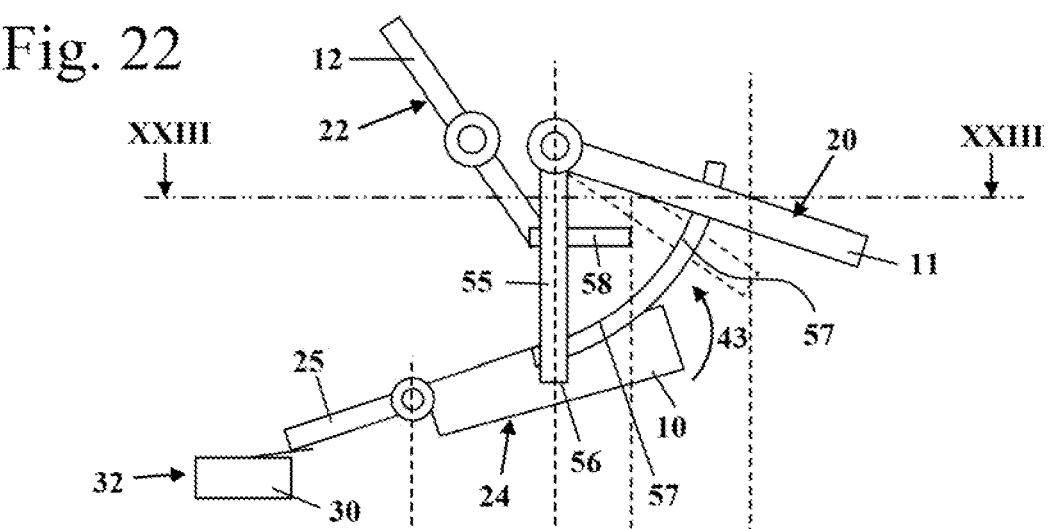
FIG. 22 shows a schematic illustration of the embodiment in FIG. 14 with an actuated first and second actuating element and actuated operator-controlled element.
Figure 23:
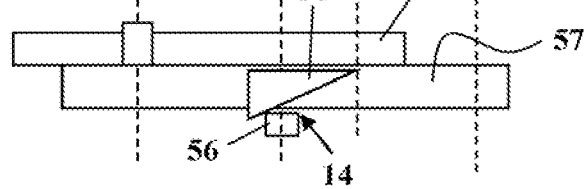
FIG. 23 shows a schematic sectional illustration along the line XXIII-XXIII in FIG. 22.

FIGS. 22 and 23 show the arrangement with the operator-controlled element 10 in its actuated position 24. When the operator-controlled element 10 is actuated, the blocking contour 57 moves with the operator-controlled element 10 past the blocking element 56, and the actuating section 25 adjusts the switch 30 into its actuated state 32.

In the embodiment according to FIGS. 14 to 23, too, an alternative operating order is possible. From the arrangement, shown in FIGS. 16 and 17, with the first actuating element 11 actuated and the second actuating element 12 not actuated, an operator can actuate the second actuating element 12. The ramp 58 deflects the arm 55 laterally as a result, such that, even in an alternative operating order, adjustment of the blocking device 13 into its enabled position 14 shown in FIGS. 20 and 21 takes place.

FIGS. 24 to 27 show an alternative embodiment. In the embodiment shown in FIGS. 24 to 27, the transfer unit 16 includes an intermediate lever 63 which is mounted so as to be pivotable about a pivot axis 64. The intermediate lever 63 has a first guide 66 which allows the intermediate lever 63 to be shifted transversely to the pivot axis 64 with respect to the pivot axis 64, in the vertical direction in the illustration in FIG. 24. The intermediate lever 63 also has a second guide 67, on which the second actuating element 12 acts. The intermediate lever 63 is spring-mounted via a spring 29. The spring 29 is schematically illustrated and configured as a compression spring and preloads the pivot lever 63 counter to any pivoting about the pivot axis 64 upon actuation of the first actuating element 11. The intermediate lever 63 is furthermore supported counter to pivoting about the pivot axis 64, upon actuation of the first actuating element 11 in the situation shown in FIG. 23, via a housing-fixed support 39. Arranged on the intermediate lever 63 is a blocking element 70 of a blocking device 13, the blocking element 70 cooperating, in the arrangement shown in FIG. 24, with a blocking section 68 of the operator-controlled element 10 and preventing any pivoting of the operator-controlled element 10. In the position shown in FIG. 24, the support 39 prevents the blocking section 68 from being able to pivot the intermediate lever 63 about the pivot axis 64 via the blocking element 70. In the position shown in FIG. 24, the first actuating element 11 is in its non-actuated position 19, the second actuating element 12 is in its non-actuated position 21, the operator-controlled element 10 is in its non-actuated position 23, and the switch 30 is in its non-actuated state 31. The blocking device 13 is in the blocking position 15.

Figure 25:
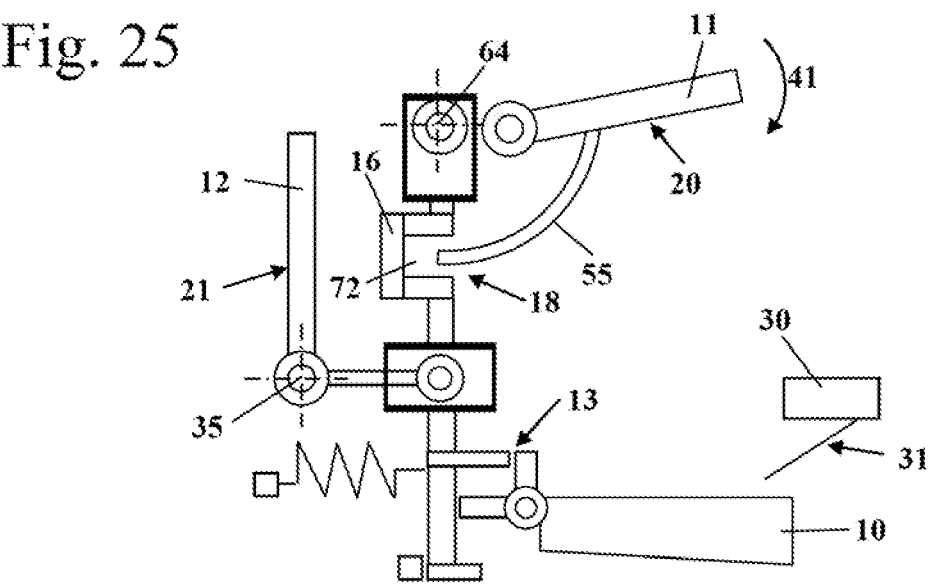
Figure 26:
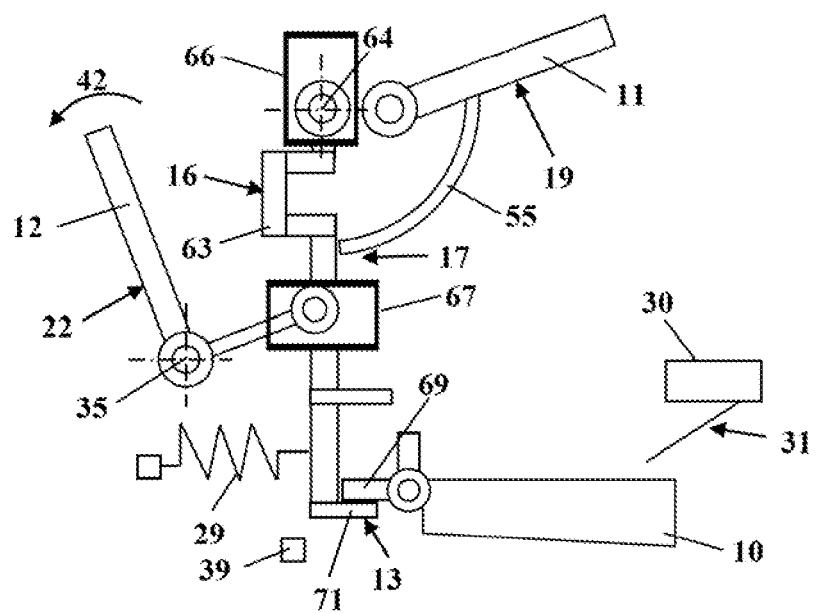

FIG. 25 shows the arrangement after the first actuating element 11 has been pivoted in the operating direction 41. An arm 55 is fixed to the first actuating element 11 in the embodiment. In the non-actuated position 21 of the second actuating element 12, the arm 55 plunges into a cutout 72 in the intermediate lever 63 upon actuation of the first actuating element 11. The first actuating element 11 does not act on the intermediate lever 63, and the transfer unit 16 formed by the intermediate lever 63 is in its inactive state 18.

Figure 24:
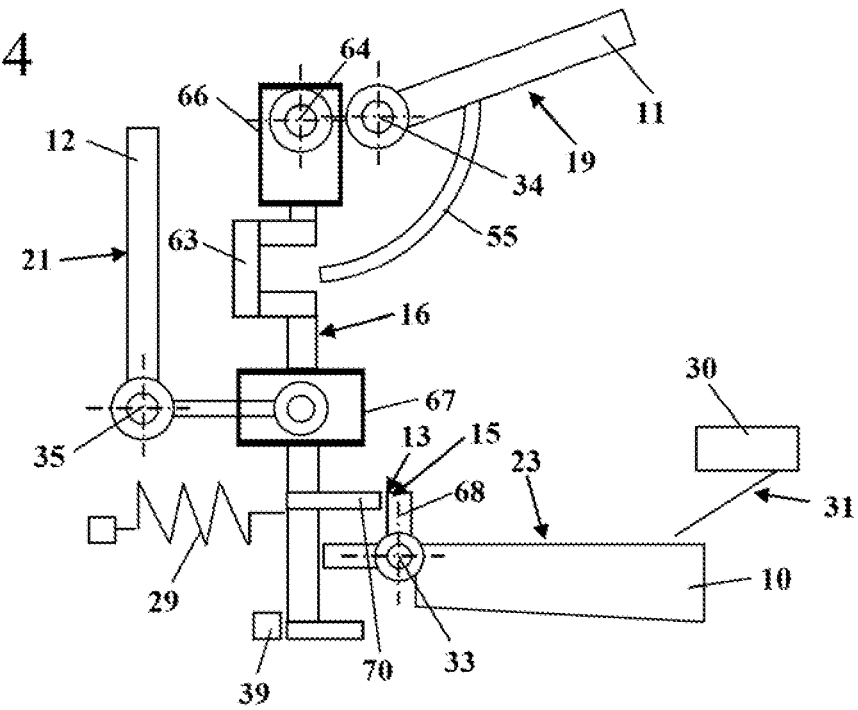
FIGS. 24 to 27 show schematic illustrations of a further embodiment in different positions of the actuating elements and of the operator-controlled element.
Figure 27:
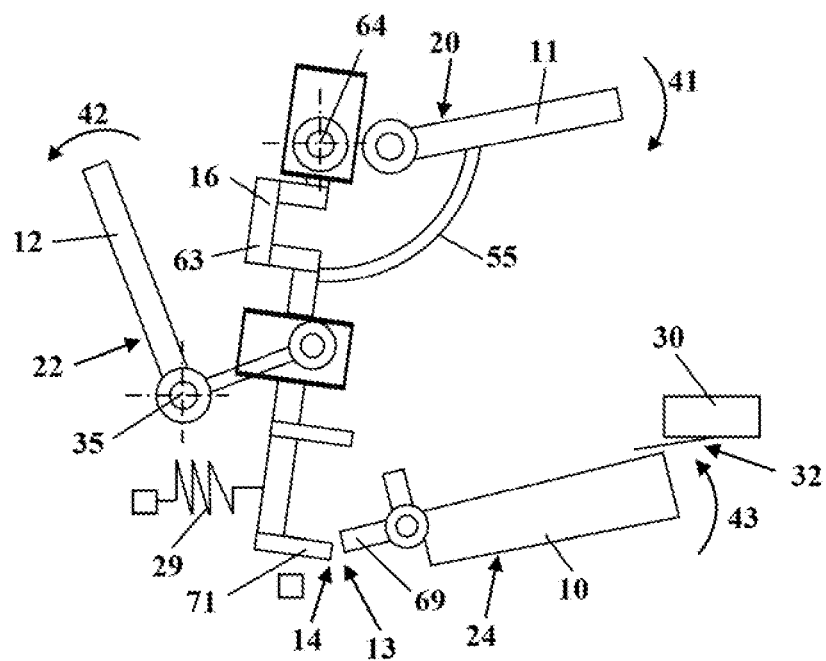

If, starting from the arrangement shown in FIG. 24, the second actuating element 12 is adjusted in the operating direction 42 into its actuated position 22, the intermediate lever 63 is shifted with respect to its pivot axis 64. The intermediate lever 63 passes out of the region of the support 39. In the position shown in FIG. 26, a blocking element 71 of the intermediate lever 63 is located in the pivoting region of a second blocking section 69 of the operator-controlled element 10. As a result, the operator-controlled element 10 can be actuated. The intermediate lever 63 is located immediately next to the free end of the arm 55, and so the transfer unit 16 is in its active state 17. If, starting from the position shown in FIG. 26, the first actuating element 11 is actuated in the operating direction 41, as shown in FIG. 27, the intermediate lever 63 pivots about the pivot axis 64 and the blocking element 71 passes out of the pivoting region of the blocking section 69. As a result, the blocking device 13 is in its enabled state 14. FIG. 27 shows the arrangement with the operator-controlled element 10 in its actuated position 24. In this position, the switch 30 is in its actuated state 32. The blocking section 69 bears with its end side on the second blocking element 71 and as a result prevents the intermediate lever 63 from being able to pivot back even when the first actuating element 11 is released by the operator.

In the embodiment according to FIGS. 24 to 27, the operating order is structurally predefined. The operator has to actuate the second actuating element 12 first, before the first actuating element 11 is actuated. If the actuating element 11 is actuated first, as shown in FIG. 25, the arm 55 blocks a subsequent movement of the second actuating element 12 and of the intermediate lever 63.

Figure 28:
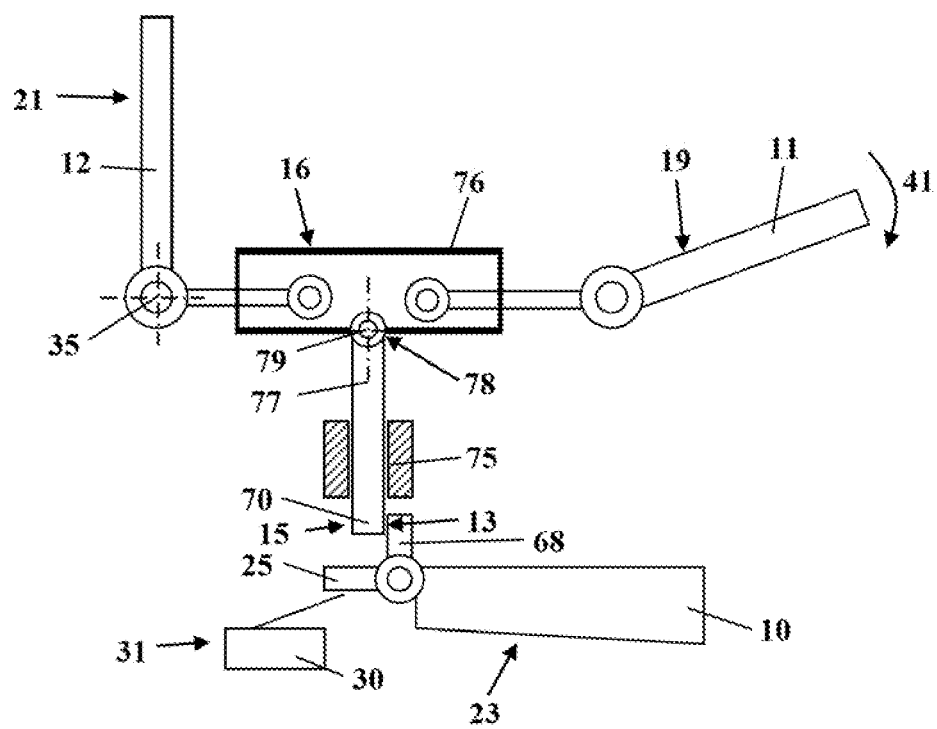
FIGS. 28 to 31 show schematic illustrations of a further embodiment in different positions of the actuating elements and of the operator-controlled element.

FIGS. 28 to 31 show a further embodiment. As FIG. 28 shows, a transfer unit 16 is provided, which includes a lever 76 on which the two actuating elements 11 and 12 act. The lever 76 is mounted on a blocking section 77 so as to be pivotable about a pivot axis 79 at a pivot joint 78. The blocking section 77 is mounted so as to be displaceable in its longitudinal direction in a housing-fixed guide 75 and forms, with its free end, a blocking element 70 of a blocking device 13. The blocking element 70 is located in the pivoting path of a blocking section 68 of the operator-controlled element 10, such that the blocking device 13 is in its blocking position 15.

Figure 29:
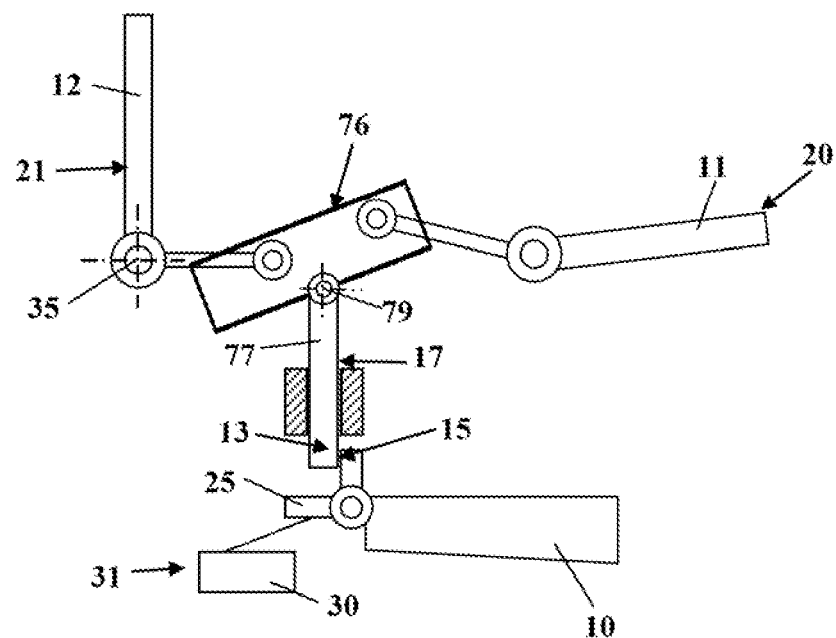

If the first actuating element 11 is moved in the operating direction 41, the arrangement passes into the position shown in FIG. 29. The lever 76 is configured in the manner of a rocker such that pivoting of an actuating element 11 causes the lever 76 to pivot about the pivot axis 79, but does not cause any movement of the blocking section 77 in its longitudinal direction. In the position shown in FIG. 29, the blocking device 13 is accordingly still in its blocking position 15. The switch 30 is in its non-actuated state 31.

Figure 30:
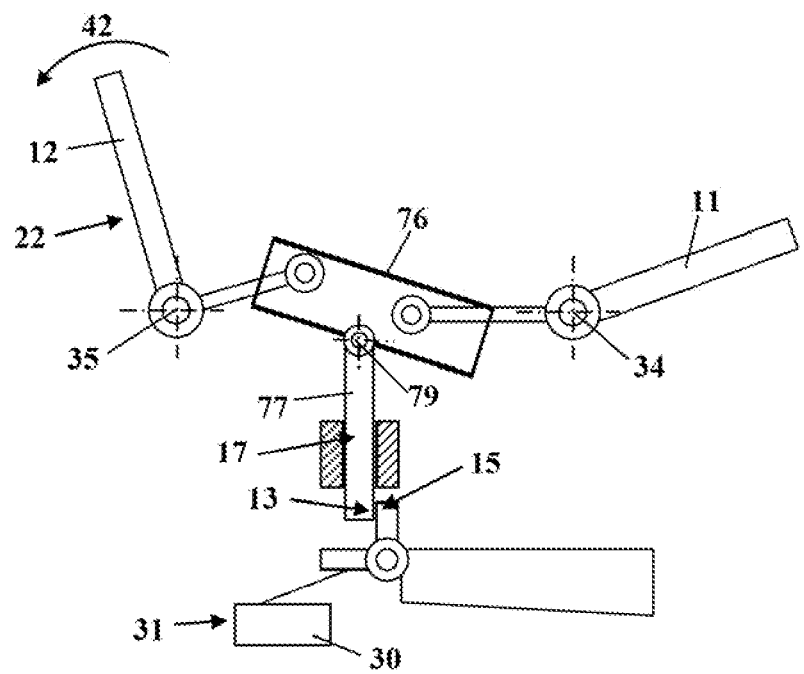

If, starting from the position shown in FIG. 28, the second actuating element 12 is actuated in the operating direction 42, as shown in FIG. 30, the lever 76 pivots in the opposite direction, but the section 77 does not move, and so the blocking device 13 continues to be in its blocking position 15.

Figure 31:
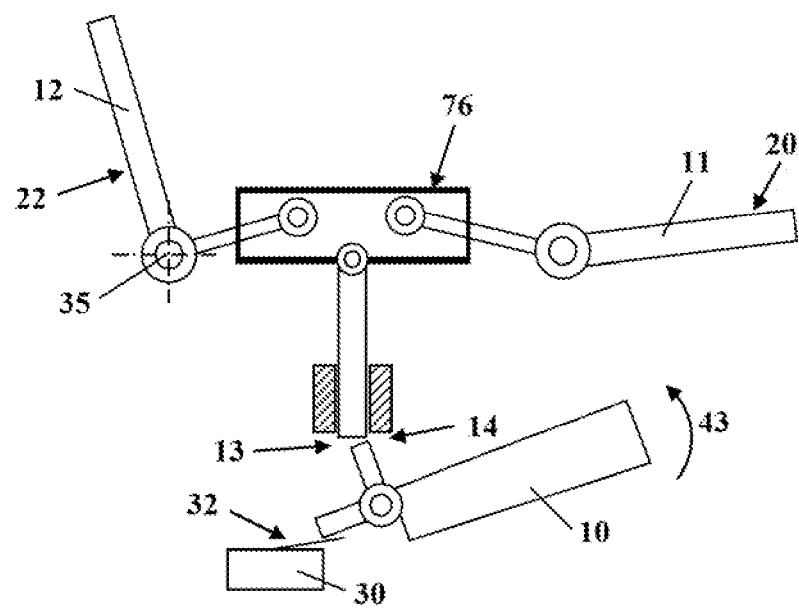

As a result of the first actuating element 11 being adjusted into its actuated position 20, as shown in FIG. 29, or as a result of the second actuating element 12 being adjusted into its actuated position 22, as shown in FIG. 30, the transfer unit 16 is shifted into its active state 17. Actuation of the other actuating element 11, 12 in each case results, as shown in FIG. 31, in the blocking device 13 being adjusted into its enabled state 14. As a result, it is possible to actuate the operator-controlled element 10, that is, to adjust the operator-controlled element 10 into its actuated state 24 shown in FIG. 31. In the embodiment according to FIGS. 28 to 31, the actuating elements 11 and 12 have the same effect, since they both each act on one end of the lever 76.

Figure 32:
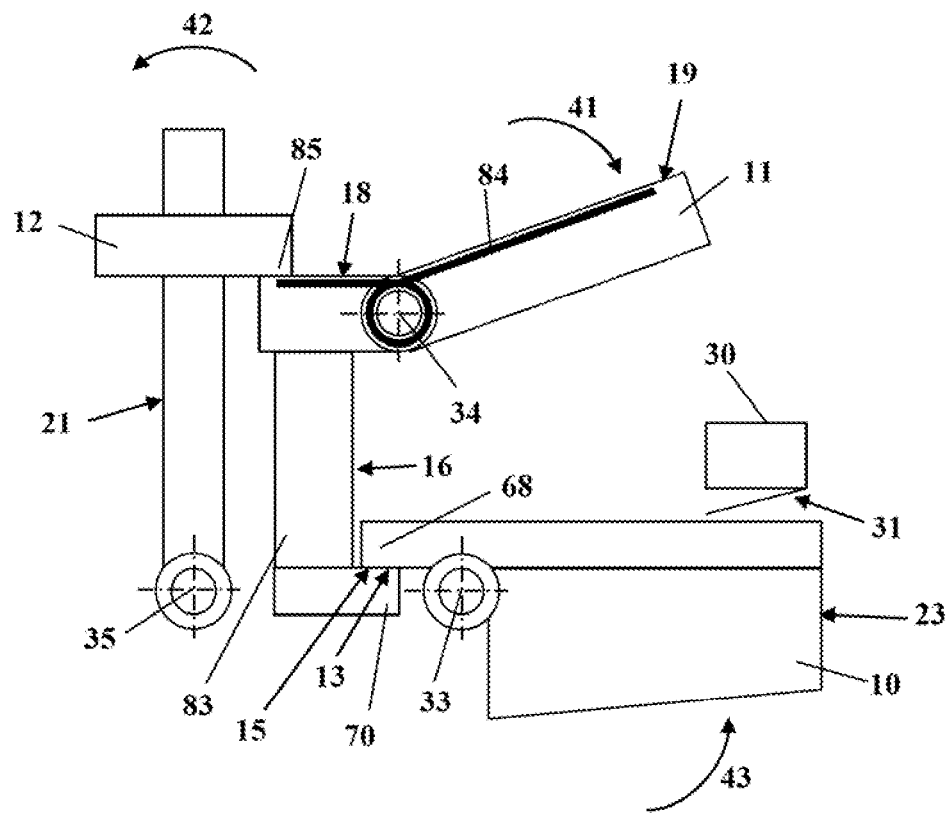
FIG. 32 shows a schematic illustration of a further embodiment.

FIG. 32 schematically shows a further embodiment with a second actuating element 12 that is mounted so as to be pivotable about a pivot axis 35, an actuating element 11 that is mounted so as to be pivotable about a pivot axis 34, and an operator-controlled element 10 that is mounted so as to be pivotable about a pivot axis 33. The operator-controlled element 10 has a blocking section 68 which, in the shown blocking state 15 of the blocking device 13, cooperates with a blocking element 70 of an intermediate lever 83. The intermediate lever 83 is mounted so as to be pivotable about the pivot axis 34 of the first actuating element 11 and is coupled to the latter via a spring 84.

FIG. 32 shows the arrangement in the non-actuated position 19 of the first actuating element 11, the non-actuated position 21 of the second actuating element 12, the inactive state 18 of the transfer unit 16, the non-actuated position 23 of the operator-controlled element 10 and the non-actuated state 31 of the switch 30. If the first actuating element 11 is actuated in the operating direction 41 from the position shown in FIG. 32, the spring 84 is tensioned. The intermediate lever 83 does not move, however, since it is mechanically prevented from executing a pivoting movement via an extension 85 of the second actuating element 12. If the second actuating element 12 is pivoted in the operating direction 42 with the first actuating element 11 not actuated, the extension 85 enables a pivoting movement of the intermediate lever 83. The transfer unit 16 is in its active state. If the first actuating element 11 is subsequently pivoted in the operating direction 41, the intermediate lever 83 pivots with the actuating element 11 and adjusts the blocking device 13 into its enabled state 14.

In the embodiment according to FIG. 32, too, an alternative operating order is possible. If the actuating element 11 is first of all actuated in the operating direction 41, the spring 84 is pretensioned. If the second actuating element 12 is then pivoted in the operating direction 42, the movement of the intermediate lever 83 is enabled and the blocking device 13 is adjusted into its enabled state 14.

Figure 33:
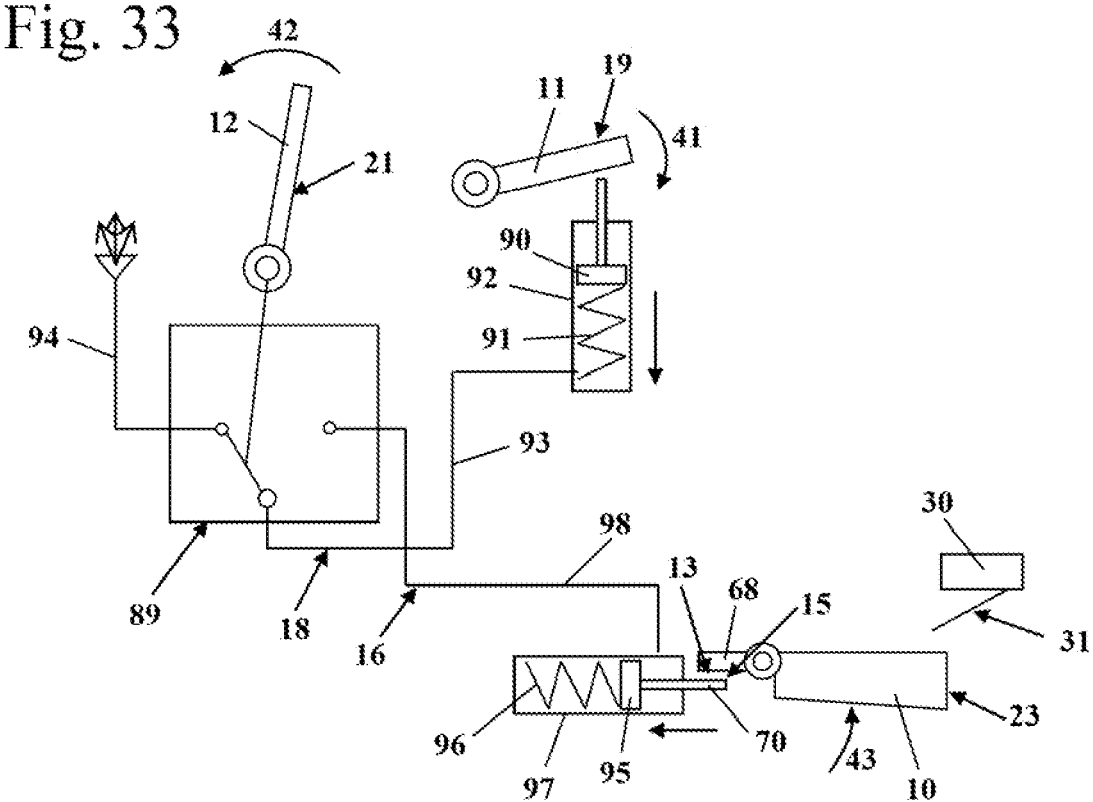
FIG. 33 shows a schematic illustration of a further embodiment with non-actuated actuating elements and a non-actuated operator-controlled element; and, FIG. 34 shows a schematic illustration of the embodiment in FIG. 33 with actuated actuating elements and an actuated operator-controlled element.
Figure 34:
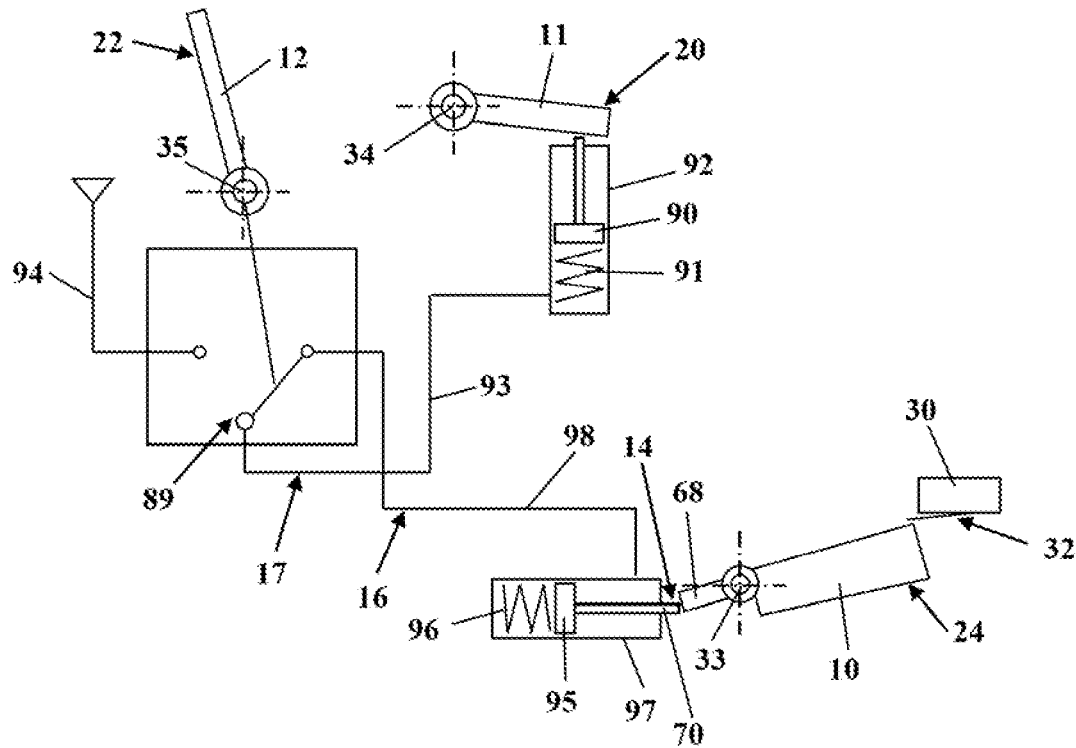

FIGS. 33 and 34 show an embodiment in which the transfer unit 16 is a hydraulic or pneumatic transfer unit 16. FIG. 33 shows the arrangement with the transfer unit 16 in the inactive state 18. The first actuating element 11 is shown in the non-actuated position 19. The first actuating element 11 acts, upon actuation in the operating direction 41, on a piston 90 which is mounted in a cylinder 92 and is preloaded counter to the operating direction 41 by a spring 91. The interior of the cylinder 91 is connected to a valve 89 via a line 93. In the non-actuated position 21 of the second actuating element 12, the valve 89 connects the line 93 to a line 94 which opens into the environment. The valve 89 is connected via a further line 98 to a piston 95 in a second cylinder 97, which is acted upon by a spring 96. Formed on the piston 95 is a blocking element 70, which cooperates, in the blocking position 15, with a blocking section 68 of the operator-controlled element 10 and as a result blocks any adjustment of the operator-controlled element 10 in the operating direction 43. The spring 96 preloads the piston 95 in the direction of the blocking position 15 of the blocking device 13. In the shown position of the valve 89, the line 93 is not connected to the line 98. Therefore, actuation of the first actuating element 11 in the operating direction 41 does not have any effect on the blocking device 13, which is in its blocking position 15 in FIG. 33, with the second actuating element 12 not actuated.

FIG. 34 shows the arrangement in the actuated position 22 of the second actuating element 12. In this position of the second actuating element 12, the valve 89 connects the line 93 to the line 98. If the first actuating element 11 is adjusted into its actuated position 20, the piston 90 moves in the cylinder 92 and pushes gas or fluid through the line 93 via the valve 89 into the line 98 and from there into the cylinder 97. This causes the piston 95 to be adjusted counter to the force of the spring 96. As a result, the blocking element 70 passes out of the pivoting path of the blocking section 68, and the operator-controlled element 10 can be moved into the actuated position 24 shown in FIG. 34. As a result, the switch 30 is adjusted into its actuated state 32. As FIG. 34 shows, the blocking section 68 and the blocking element 70 are arranged such that the blocking section 68 keeps the blocking element 70 in the enabled position 14 of the blocking device 13 with the operator-controlled element 10 in the actuated position 24. As a result, the operator can release the actuating elements 11 and 12 with the operator-controlled element 10 in the actuated position 24.

Further advantageous embodiments are achieved by any desired combinations of the above-described embodiments. The schematic illustrations reproduce the individual operating principles and are not limited to the configuration shown, but can be modified in a suitable manner, while retaining the operating principles, in order to obtain advantageous structural configurations.

It is understood that the foregoing description is that of the preferred embodiments of the invention and that various changes and modifications may be made thereto without departing from the spirit and scope of the invention as defined in the appended claims.

What is claimed is:

1. A hand-guided work apparatus comprising:
a drive motor;
an operator-controlled element for controlling said drive motor;
a housing;
a blocking device for said operator-controlled element;
said blocking device having an enable position wherein said operator-controlled element is enabled to control said drive motor and a blocking position wherein said blocking device mechanically blocks an actuation of said operator-controlled element;
a first actuating element having an actuated position and a non-actuated position;
a second actuating element having an actuated position and a non-actuated position;
a lever pivotally mounted to said blocking device;
said first actuating element and said second actuating element being configured to act on said lever, wherein said first actuating device and said second actuating device are both pivotally mounted to said apparatus such that a respective pivotal motion of said first and second actuating elements moves said first and second actuating elements from said respective non-actuated position to said respective actuated position independently; and,
said lever being coupled to said blocking device so as to linearly shift said blocking device into said enable position only when both said first actuating element and said second actuating element are pivoted to the respective actuated positions.

2. The hand-guided apparatus of claim 1, wherein said lever is pivotally mounted on a pivot joint and said first actuating element and said second actuating element are so coupled to said lever that an adjustment of said first actuating element as well as said second actuating element into the respective actuated positions thereof effects a shifting of said pivot joint.

3. A hand-guided work apparatus comprising:
a drive motor;
an operator-controlled element for controlling said drive motor;
a housing;
a blocking device for said operator-controlled element;
said blocking device having an enable position wherein said operator-controlled element is enabled to control said drive motor and a blocking position wherein said blocking device mechanically blocks an actuation of said operator-controlled element;
a first actuating element having an actuated position and a non-actuated position;
a second actuating element having an actuated position and a non-actuated position;
a lever pivotally mounted to said blocking device;
said first actuating element and said second actuating element being configured to act on said lever;
said lever being coupled to said blocking device so as to shift said blocking device into said enable position only when said first actuating element as well as said second actuating element are moved into their respective actuated positions; and,
said lever being mounted on said blocking device in a manner of a rocker so that an adjustment of only one of said first actuating element and said second actuating element to the respective actuated position does not effect a shift of said blocking device into said enable position.

4. The hand-guided apparatus of claim 3, wherein said lever is pivotally mounted on a pivot joint and said first actuating element and said second actuating element are so coupled to said lever that an adjustment of said first actuating element as well as said second actuating element into the respective actuated positions thereof effects a shifting of said pivot joint.

* * * * *